(12) United States Patent
Champredonde et al.

(10) Patent No.: US 9,715,511 B2
(45) Date of Patent: Jul. 25, 2017

(54) METHOD OF UPDATING A DATABASE FOR MANAGING A VEHICLE FLEET

(75) Inventors: Jonathan Champredonde, Clermont-Ferrand (FR); Marcos Contreras, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1030 days.

(21) Appl. No.: 13/813,803

(22) PCT Filed: Aug. 2, 2011

(86) PCT No.: PCT/FR2011/051862
§ 371 (c)(1),
(2), (4) Date: Mar. 18, 2013

(87) PCT Pub. No.: WO2012/017180
PCT Pub. Date: Feb. 9, 2012

(65) Prior Publication Data
US 2013/0191331 A1    Jul. 25, 2013

(30) Foreign Application Priority Data
Aug. 2, 2010 (FR) .................................. 10 56383

(51) Int. Cl.
*G06F 17/30* (2006.01)
*G06Q 10/06* (2012.01)
(Continued)

(52) U.S. Cl.
CPC ...... *G06F 17/30286* (2013.01); *B60C 11/246* (2013.01); *B60C 23/008* (2013.01);
(Continued)

(58) Field of Classification Search
CPC .......... G06F 17/30286; B60C 23/0493; B60C 23/0415
(Continued)

(56) References Cited

U.S. PATENT DOCUMENTS

| 5,657,460 A | 8/1997 | Egan et al. ................... 395/326 |
| 6,338,045 B1 | 1/2002 | Pappas ........................... 705/29 |

(Continued)

FOREIGN PATENT DOCUMENTS

| EP | 0 232 213 A2 | 8/1987 |
| FR | 2 853 857 A1 | 10/2004 |
| FR | 2 916 564 A1 | 11/2008 |

OTHER PUBLICATIONS

Communication from EPO dated Jun. 22, 2015, regarding Application No. 11 757 380.8-1558.

*Primary Examiner* — Jean M Corrielus
(74) *Attorney, Agent, or Firm* — Fitzpatrick, Cella, Harper & Scinto

(57) ABSTRACT

A handling machine performs a method for updating a database for managing a fleet of vehicles, during replacement of a tire on a vehicle that includes a plurality of predetermined spatial zones. The database includes a tire identifier for each tire of the vehicle and a zone identifier for each predetermined spatial zone. Each of the tire identifiers is associated with a corresponding one of the zone identifiers in the database. A zone identifier of a spatial zone containing a tire is determined when first predetermined conditions are met, and a tire identifier of the tire is determined when second predetermined conditions are met. An association in the database between a zone identifier and a tire identifier is updated if at least the first and second predetermined conditions are met simultaneously at least once.

10 Claims, 15 Drawing Sheets

(51) Int. Cl.
  *G06Q 10/08* (2012.01)
  *B60C 11/24* (2006.01)
  *G08C 17/02* (2006.01)
  *B60C 23/00* (2006.01)
  *B60C 23/04* (2006.01)

(52) U.S. Cl.
  CPC ...... *B60C 23/0415* (2013.01); *B60C 23/0493* (2013.01); *G06Q 10/06* (2013.01); *G06Q 10/087* (2013.01); *G08C 17/02* (2013.01)

(58) Field of Classification Search
  USPC ........................................................ 707/609
  See application file for complete search history.

(56) References Cited

U.S. PATENT DOCUMENTS

| | | | | |
|---|---|---|---|---|
| 6,864,785 | B2 * | 3/2005 | Marguet | B60C 23/0433 340/445 |
| 6,983,648 | B2 * | 1/2006 | Grout | G06Q 10/06 73/129 |
| 7,648,062 | B2 | 1/2010 | Corniot | 235/375 |
| 7,962,096 | B2 * | 6/2011 | Cox | G06Q 10/08 340/539.21 |
| 8,190,304 | B2 * | 5/2012 | Feuillebois | G06Q 50/28 235/492 |
| 8,405,495 | B2 | 3/2013 | Heller et al. | 340/438 |
| 8,744,692 | B2 * | 6/2014 | Carresjo | B60C 23/0416 701/48 |
| 2004/0073339 | A1 * | 4/2004 | Ruoppolo | B60C 23/0408 701/1 |
| 2005/0246092 | A1 * | 11/2005 | Moscatiello | G01S 5/0072 701/408 |
| 2006/0106561 | A1 * | 5/2006 | Thiesen | B60C 23/007 702/104 |
| 2007/0082613 | A1 * | 4/2007 | Cox | G06Q 10/08 455/41.2 |
| 2007/0176748 | A1 * | 8/2007 | Salamitou | G06K 19/0724 340/10.1 |
| 2009/0234517 | A1 * | 9/2009 | Feuillebois | G06Q 50/28 701/3 |
| 2010/0139383 | A1 * | 6/2010 | Haswell | B60C 11/24 73/146 |
| 2010/0256874 | A1 * | 10/2010 | Carresjo | B60C 23/0416 701/48 |
| 2011/0128163 | A1 * | 6/2011 | Gilleland | G06Q 10/063114 340/988 |
| 2011/0131269 | A1 * | 6/2011 | Gilleland | G06Q 10/063114 709/202 |

* cited by examiner

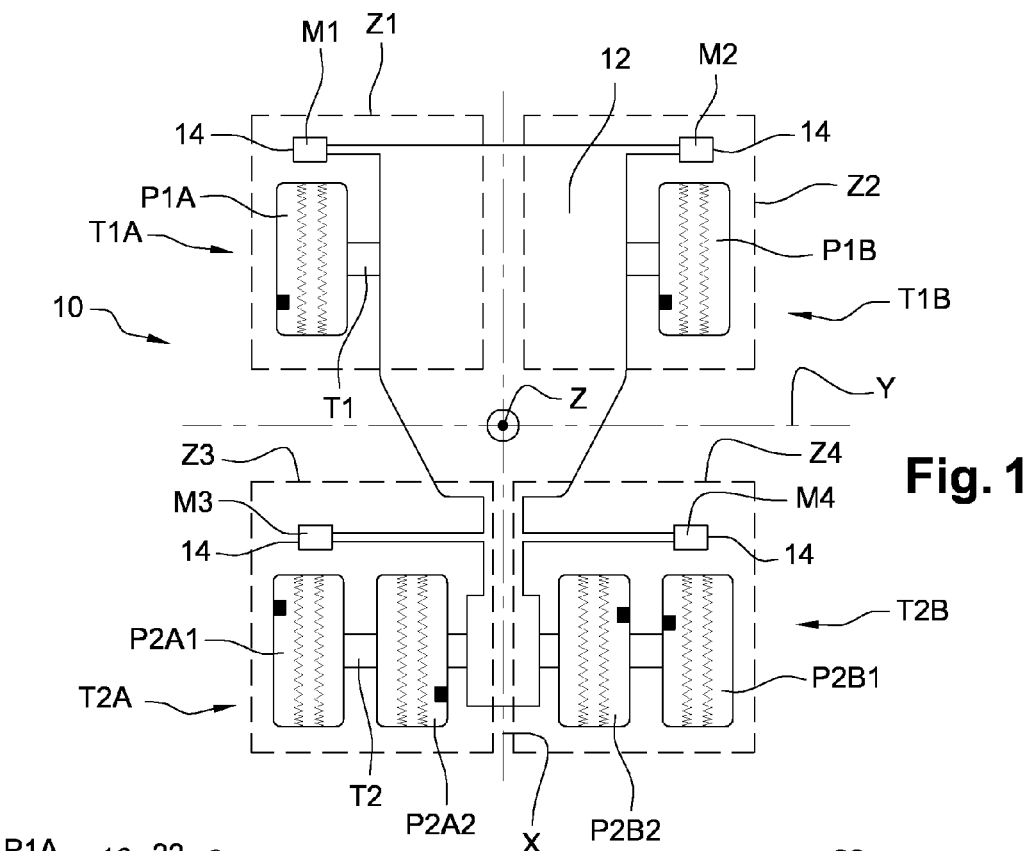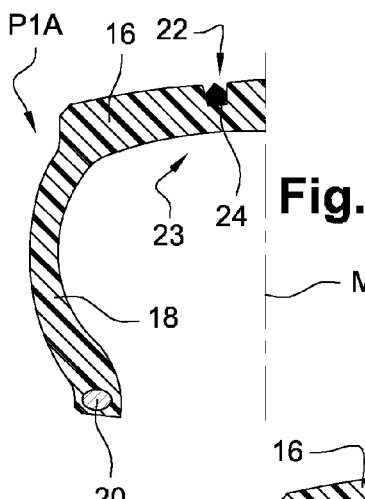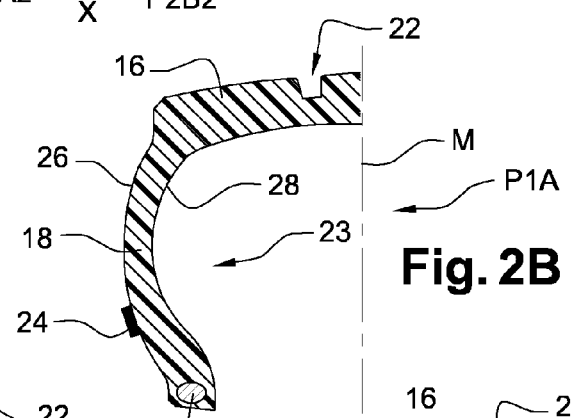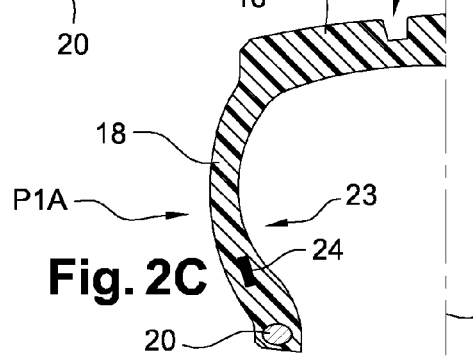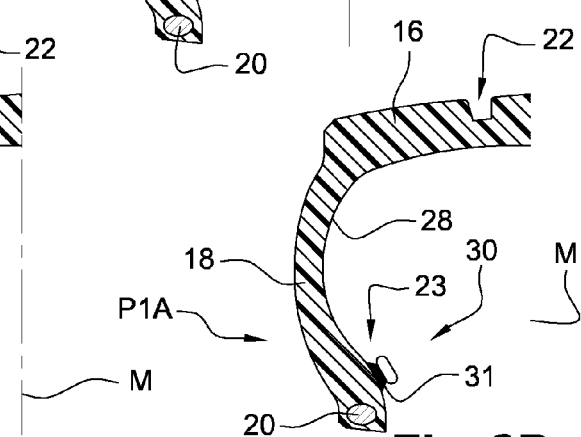

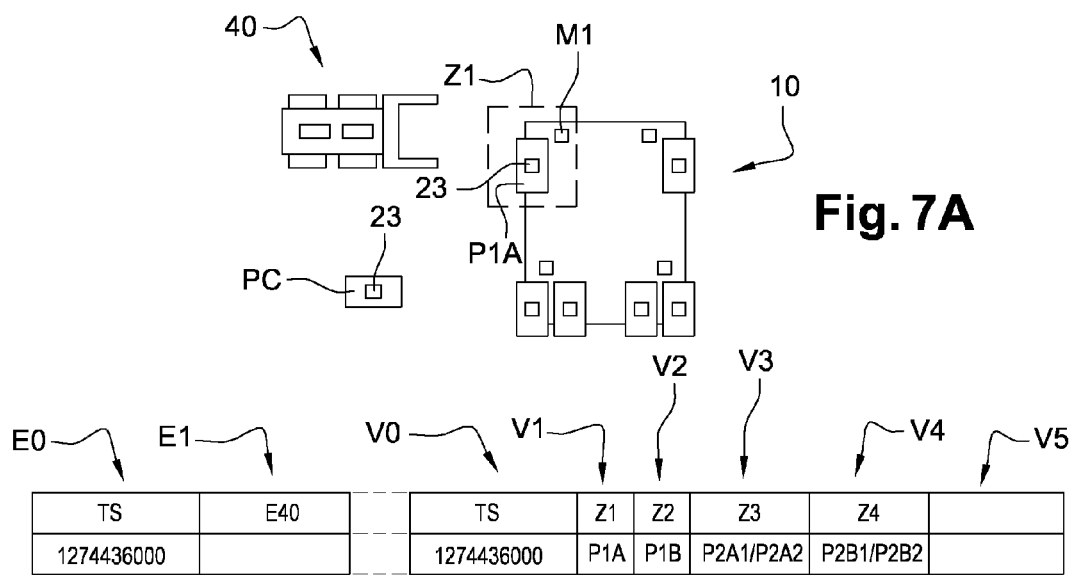
Fig. 7A
Fig. 8A
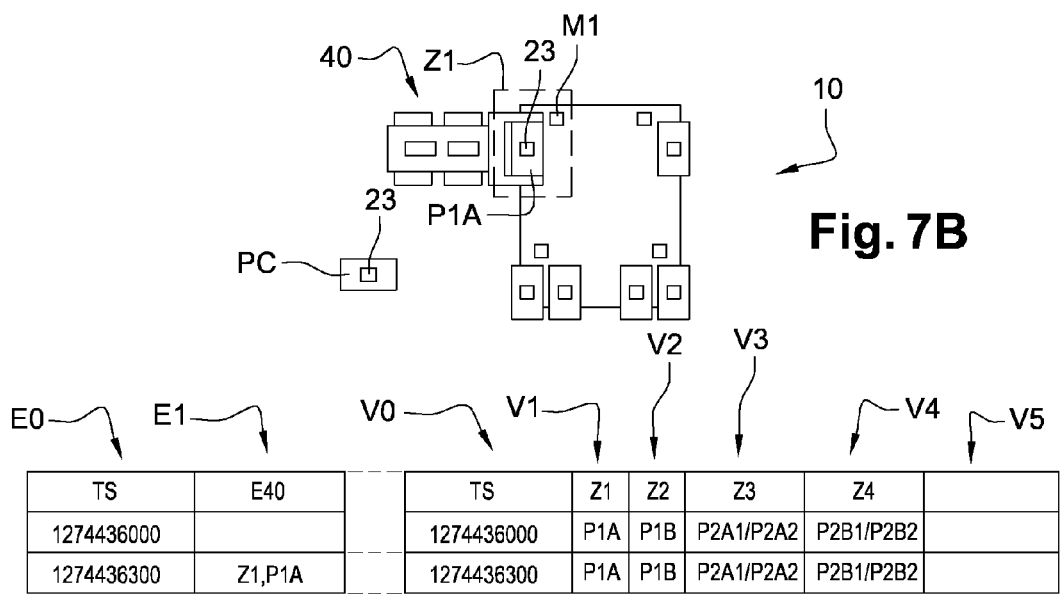
Fig. 7B
Fig. 8B

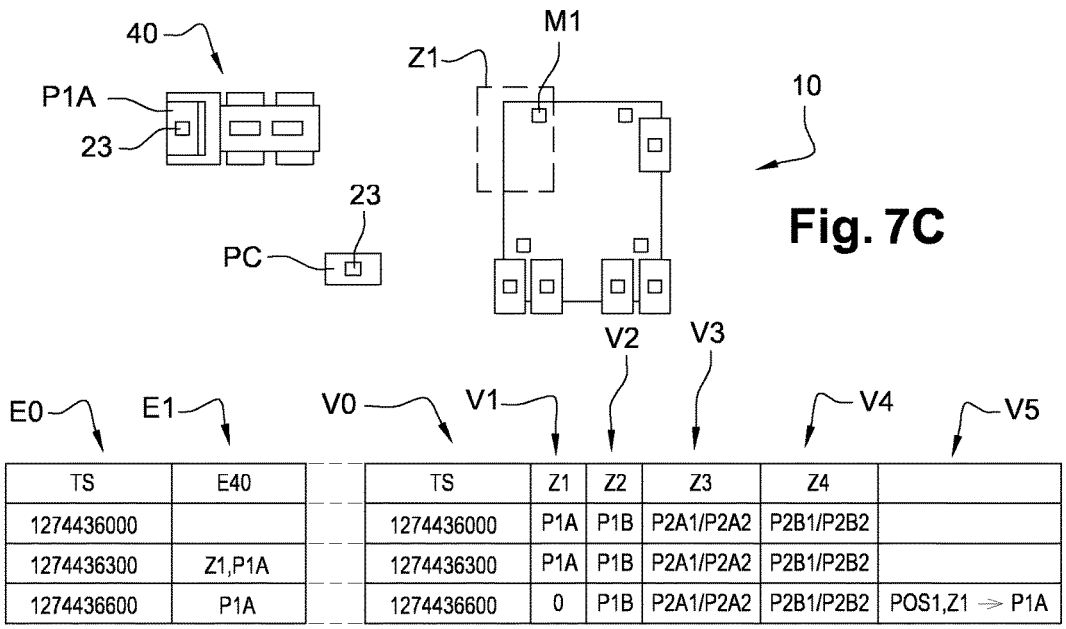
Fig. 7C
Fig. 8C
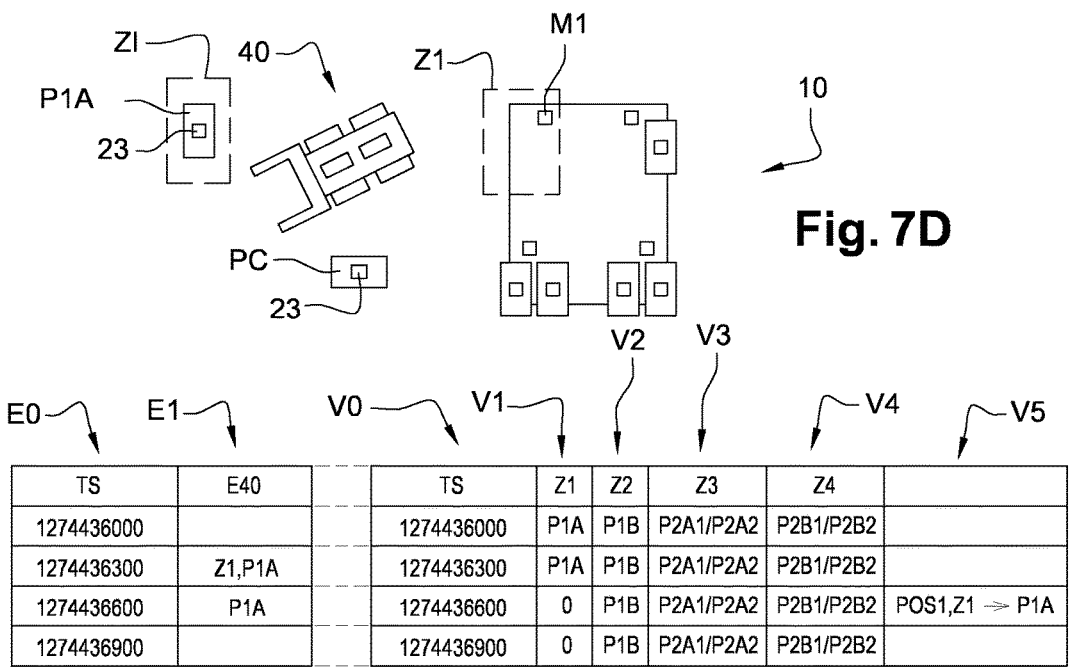
Fig. 7D
Fig. 8D

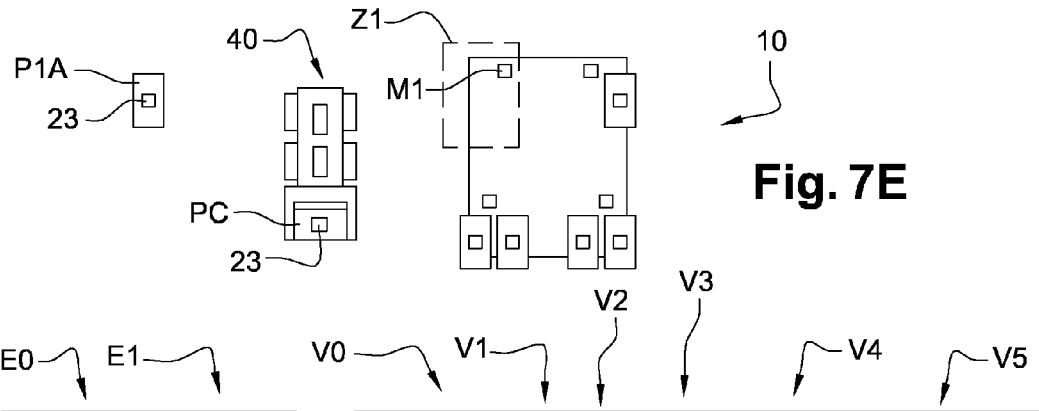
Fig. 7E
Fig. 8E
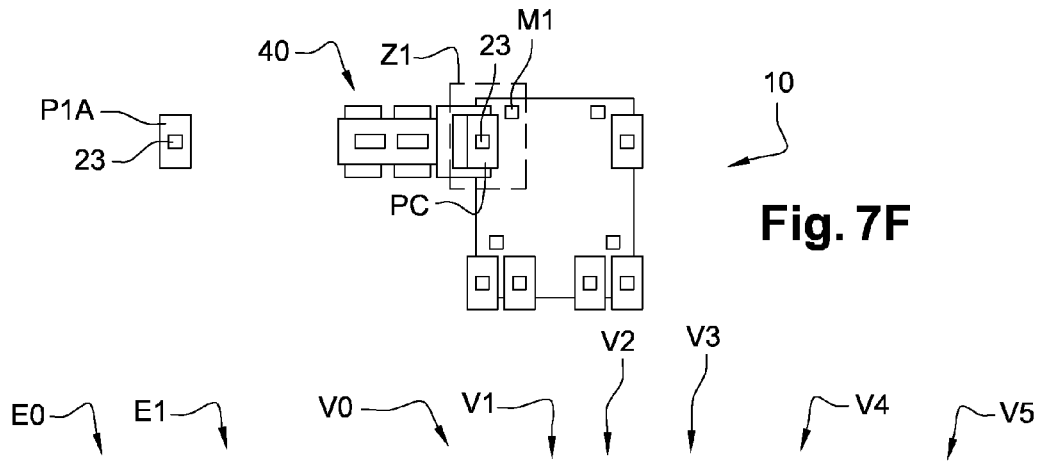
Fig. 7F
Fig. 8F

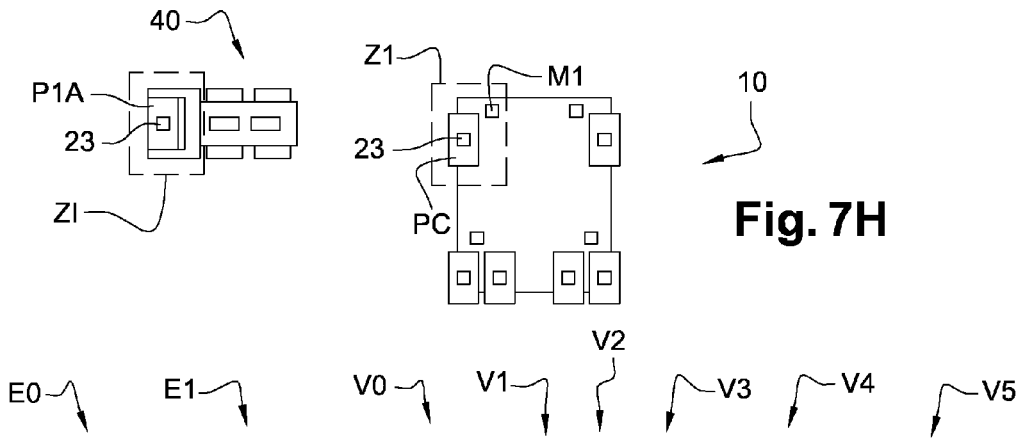
Fig. 7H
Fig. 8H
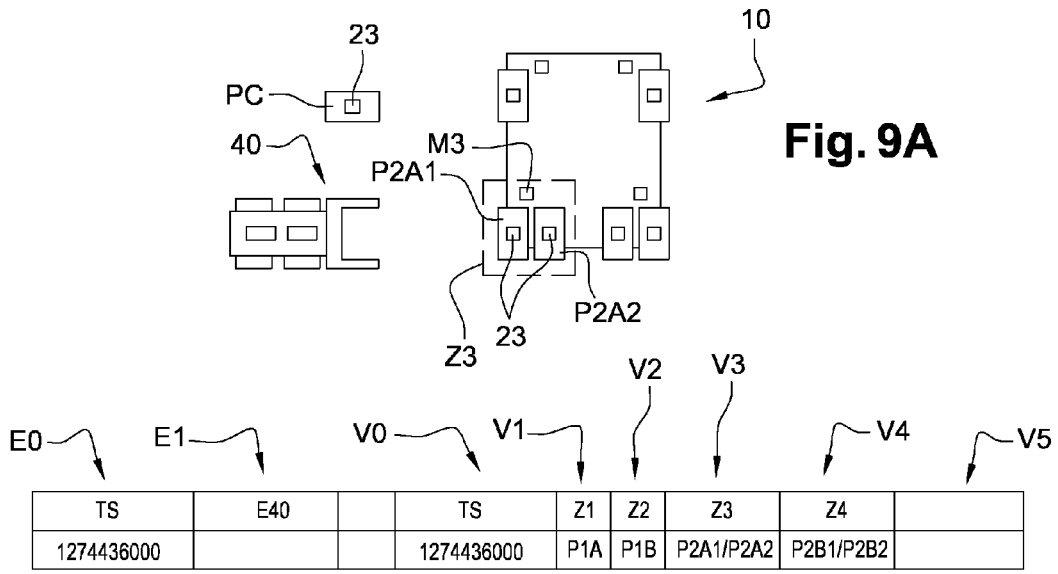
Fig. 9A
Fig. 10A

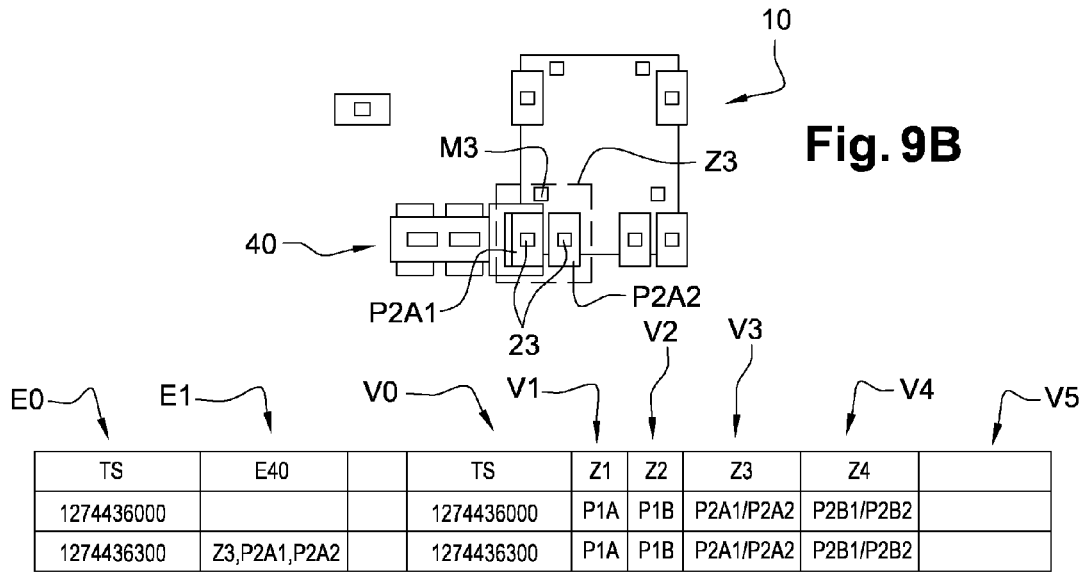
Fig. 9B
Fig. 10B
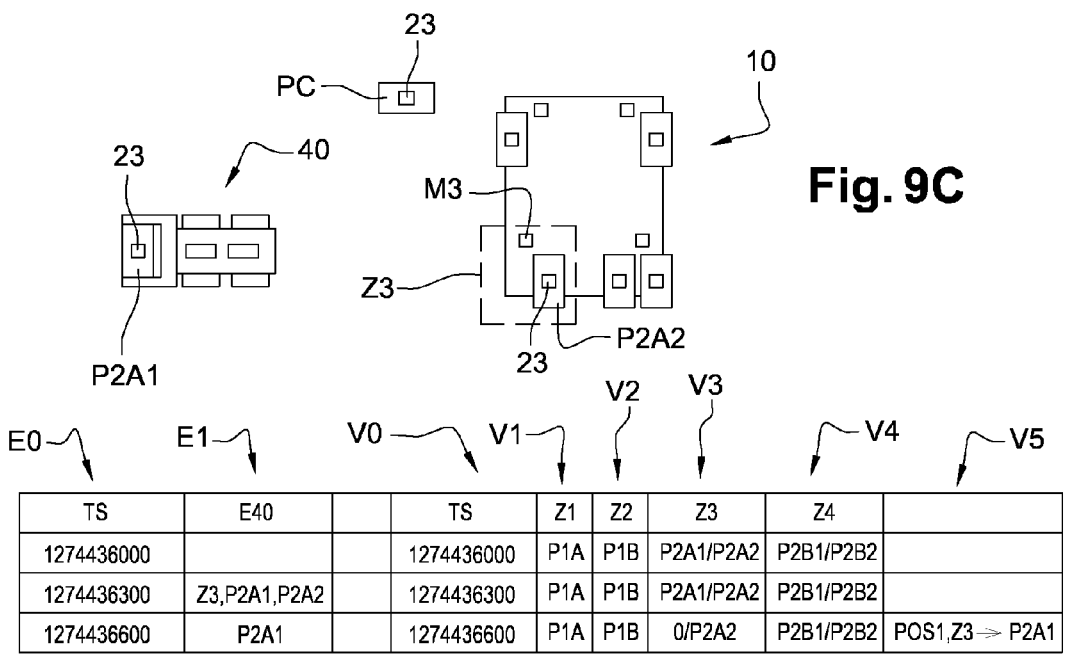
Fig. 9C
Fig. 10C

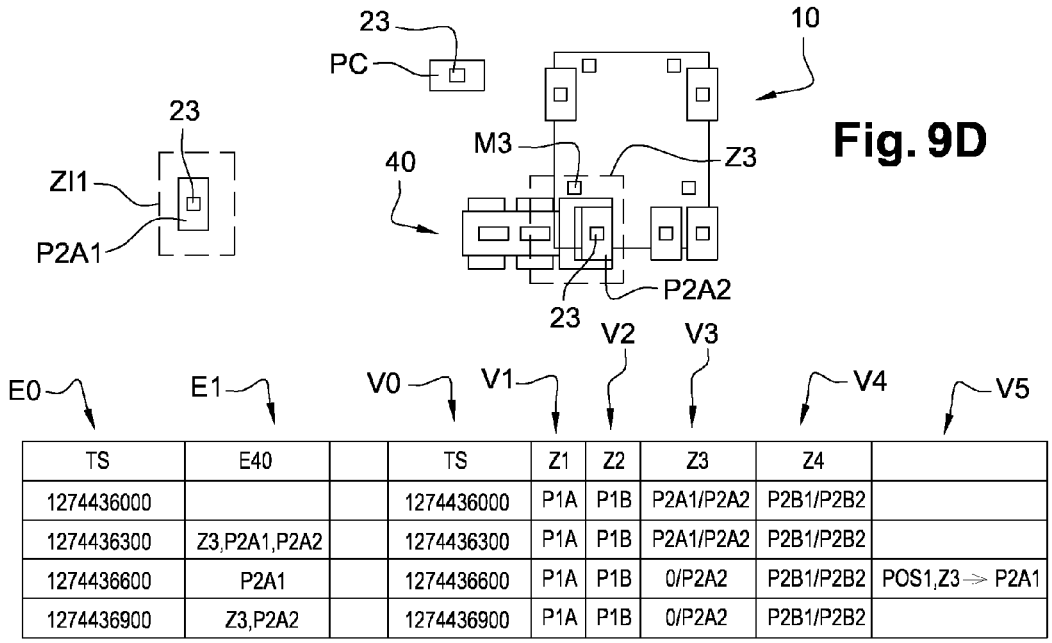
Fig. 9D
Fig. 10D
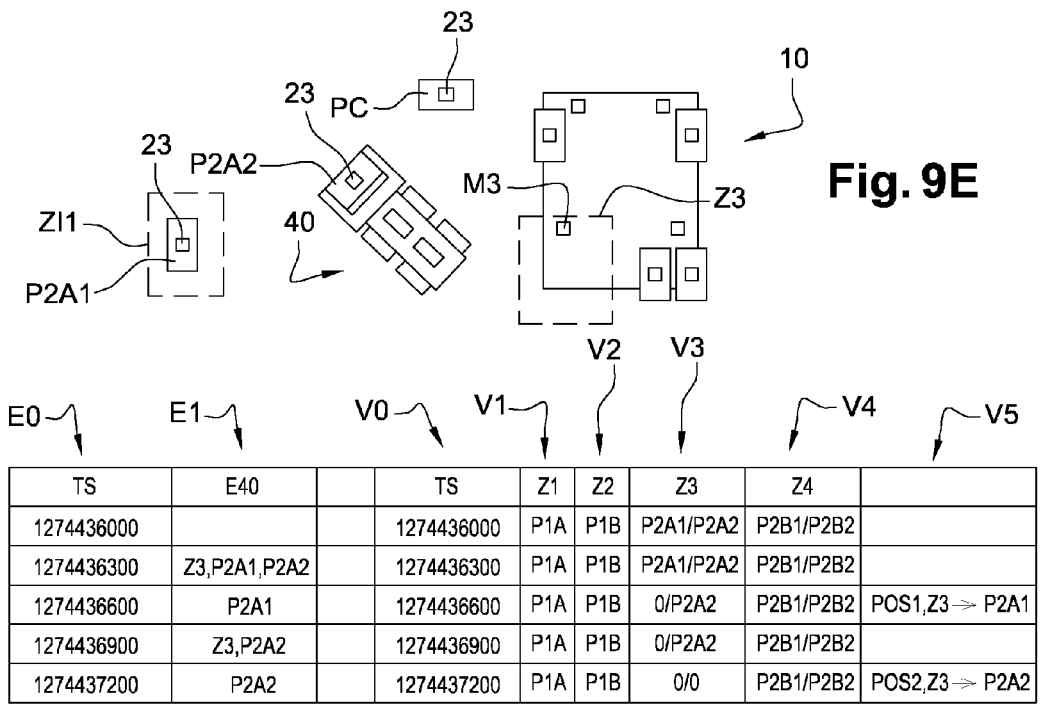
Fig. 9E
Fig. 10E

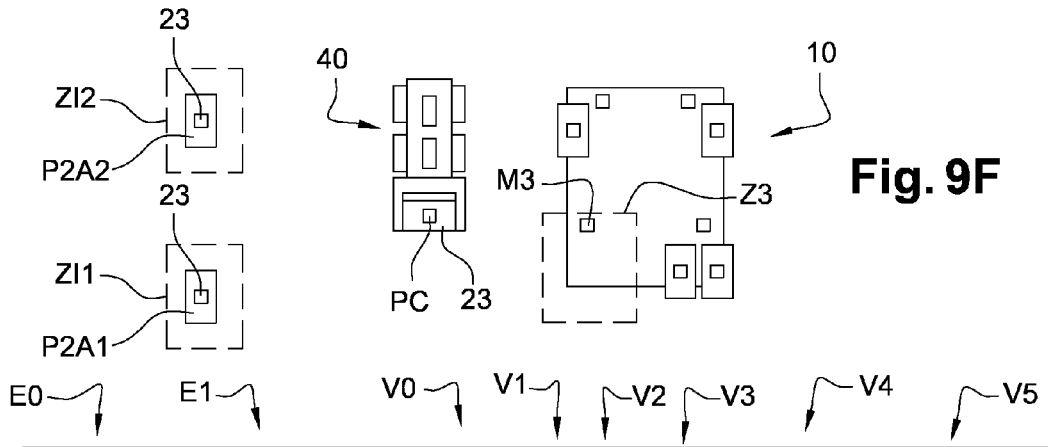
Fig. 9F
Fig. 10F
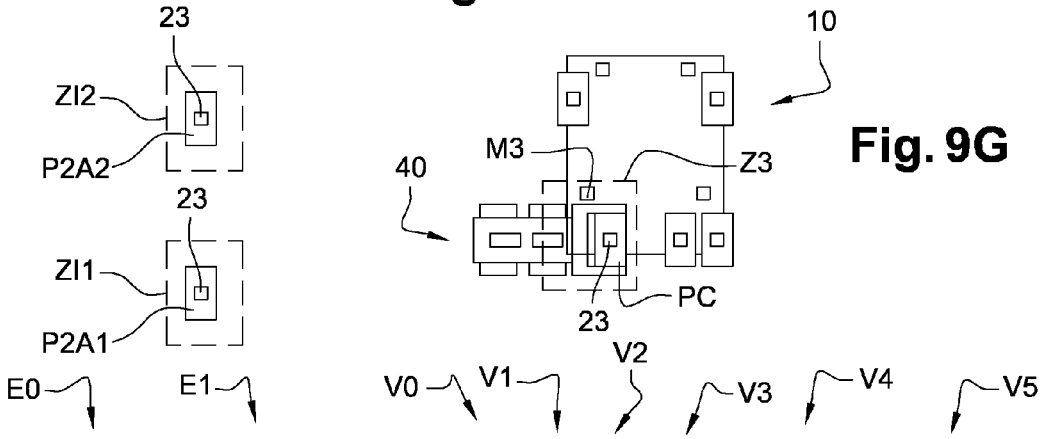
Fig. 9G
Fig. 10G

| E0 | E1 | V0 | V1 | V2 | V3 | V4 | V5 |
|---|---|---|---|---|---|---|---|
| TS | E40 | TS | Z1 | Z2 | Z3 | Z4 | |
| 1274436000 | | 1274436000 | P1A | P1B | P2A1/P2A2 | P2B1/P2B2 | |
| 1274436300 | Z3,P2A1,P2A2 | 1274436300 | P1A | P1B | P2A1/P2A2 | P2B1/P2B2 | |
| 1274436600 | P2A1 | 1274436600 | P1A | P1B | 0/P2A2 | P2B1/P2B2 | POS1,Z3 → P2A1 |
| 1274436900 | Z3,P2A2 | 1274436900 | P1A | P1B | 0/P2A2 | P2B1/P2B2 | |
| 1274437200 | P2A2 | 1274437200 | P1A | P1B | 0/0 | P2B1/P2B2 | POS2,Z3 → P2A2 |
| 1274437500 | PC | 1274437500 | P1A | P1B | 0/0 | P2B1/P2B2 | |
| 1274437800 | Z3,PC | 1274437800 | P1A | P1B | 0/PC | P2B1/P2B2 | |
| 1274438100 | | 1274438100 | P1A | P1B | 0/PC | P2B1/P2B2 | PC → POS2,Z3 |

| E0 | E1 | | V0 | V1 | V2 | V3 | V4 | V5 |
|---|---|---|---|---|---|---|---|---|
| TS | E40 | | TS | Z1 | Z2 | Z3 | Z4 | |
| 1274436000 | | | 1274436000 | P1A | P1B | P2A1/P2A2 | P2B1/P2B2 | |
| 1274436300 | Z3,P2A1,P2A2 | | 1274436300 | P1A | P1B | P2A1/P2A2 | P2B1/P2B2 | |
| 1274436600 | P2A1 | | 1274436600 | P1A | P1B | 0/P2A2 | P2B1/P2B2 | POS1,Z3 → P2A1 |
| 1274436900 | Z3,P2A2 | | 1274436900 | P1A | P1B | 0/P2A2 | P2B1/P2B2 | |
| 1274437200 | P2A2 | | 1274437200 | P1A | P1B | 0/0 | P2B1/P2B2 | POS2,Z3 → P2A2 |
| 1274437500 | PC | | 1274437500 | P1A | P1B | 0/0 | P2B1/P2B2 | |
| 1274437800 | Z3,PC | | 1274437800 | P1A | P1B | 0/PC | P2B1/P2B2 | |
| 1274438100 | | | 1274438100 | P1A | P1B | 0/PC | P2B1/P2B2 | PC → POS2,Z3 |
| 1274438400 | P2A1 | | 1274438400 | P1A | P1B | 0/PC | P2B1/P2B2 | |
| 1274438700 | Z3,P2A1,PC | | 1274438700 | P1A | P1B | 0/PC | P2B1/P2B2 | |

| E0 | E1 | | V0 | V1 | V2 | V3 | V4 | V5 |
|---|---|---|---|---|---|---|---|---|
| TS | E40 | | TS | Z1 | Z2 | Z3 | Z4 | |
| 1274436000 | | | 1274436000 | P1A | P1B | P2A1/P2A2 | P2B1/P2B2 | |
| 1274436300 | Z3,P2A1,P2A2 | | 1274436300 | P1A | P1B | P2A1/P2A2 | P2B1/P2B2 | |
| 1274436600 | P2A1 | | 1274436600 | P1A | P1B | 0/P2A2 | P2B1/P2B2 | POS1,Z3 → P2A1 |
| 1274436900 | Z3,P2A2 | | 1274436900 | P1A | P1B | 0/P2A2 | P2B1/P2B2 | |
| 1274437200 | P2A2 | | 1274437200 | P1A | P1B | 0/0 | P2B1/P2B2 | POS2,Z3 → P2A2 |
| 1274437500 | PC | | 1274437500 | P1A | P1B | 0/0 | P2B1/P2B2 | |
| 1274437800 | Z3,PC | | 1274437800 | P1A | P1B | 0/PC | P2B1/P2B2 | |
| 1274438100 | | | 1274438100 | P1A | P1B | 0/PC | P2B1/P2B2 | PC → POS2,Z3 |
| 1274438400 | P2A1 | | 1274438400 | P1A | P1B | 0/PC | P2B1/P2B2 | |
| 1274438700 | Z3,P2A1,PC | | 1274438700 | P1A | P1B | 0/PC | P2B1/P2B2 | |
| 1274439000 | | | 1274439000 | P1A | P1B | 0/PC | P2B1/P2B2 | P2A1 → POS1,Z3 |

| TS | E40 |  | TS | Z1 | Z2 | Z3 | Z4 |  |
|---|---|---|---|---|---|---|---|---|
| 1274436000 |  |  | 1274436000 | P1A | P1B | P2A1/P2A2 | P2B1/P2B2 |  |
| 1274436300 | Z3,P2A1,P2A2 |  | 1274436300 | P1A | P1B | P2A1/P2A2 | P2B1/P2B2 |  |
| 1274436600 | P2A1 |  | 1274436600 | P1A | P1B | 0/P2A2 | P2B1/P2B2 | POS1,Z3→P2A1 |
| 1274436900 | Z3,P2A2 |  | 1274436900 | P1A | P1B | 0/P2A2 | P2B1/P2B2 |  |
| 1274437200 | P2A2 |  | 1274437200 | P1A | P1B | 0/0 | P2B1/P2B2 | POS2,Z3→P2A2 |
| 1274437500 | PC |  | 1274437500 | P1A | P1B | 0/0 | P2B1/P2B2 |  |
| 1274437800 | Z3,PC |  | 1274437800 | P1A | P1B | 0/PC | P2B1/P2B2 |  |
| 1274438100 |  |  | 1274438100 | P1A | P1B | 0/PC | P2B1/P2B2 | PC→POS2,Z3 |
| 1274438400 | P2A1 |  | 1274438400 | P1A | P1B | 0/PC | P2B1/P2B2 |  |
| 1274438700 | Z3,P2A1,PC |  | 1274438700 | P1A | P1B | 0/PC | P2B1/P2B2 |  |
| 1274439000 |  |  | 1274439000 | P1A | P1B | P2A1/PC | P2B1/P2B2 | P2A1→POS1,Z3 |
| 1274439300 | P2A2 |  | 1274439300 | P1A | P1B | P2A1/PC | P2B1/P2B2 |  |

METHOD OF UPDATING A DATABASE FOR MANAGING A VEHICLE FLEET

FIELD OF THE INVENTION

The present invention relates to the field of managing a vehicle fleet, notably the tyres of these vehicles. More specifically, it is applicable to the field of civil engineering vehicles, but is not limited thereto.

BACKGROUND

A civil engineering vehicle generally comprises a plurality of wheels, each having a tyre. The vehicle and each tyre comprise visual identification means, for example identifiers in the form of sequences of alphanumeric characters.

In order to manage the vehicle fleet, an operator manually records the tyres present on each vehicle and the position of each tyre. Thus, when a tyre is changed, the operator must also manually replace the identifier of the tyre which is to be replaced with the identifier of the replacement tyre, together with an identifier of the position on the vehicle where the replacement has been carried out. He also records the identifier of the vehicle on which the tyre has been changed.

The operator, who is the database manager, writes down on paper these changes observed on the vehicle. On returning to his office, he then manually updates a database, recording the different identifiers therein. Additionally, if the vehicle has a tyre monitoring system, for example a system for monitoring the tyre pressures, he must also update the data relating thereto.

Unfortunately, the operator may make errors when recording the identifiers of the tyres, the vehicle or the tyre positions, or even the time data, for example the date of replacement. Thus, for example, the operator may associate the identifier of the replacement tyre with the identifier of a vehicle other than that on which the replacement has actually been carried out, or vice versa. These recording errors reduce the reliability of the database.

BRIEF DESCRIPTION OF THE INVENTION

The object of the invention is to provide a more reliable database.

For this purpose, the invention proposes a tyre handling machine comprising first and second reading means for reading first and second readable means respectively, the first and second reading means being arranged in such a way that:
- the first reading means can read the first readable means if the first reading means meets at least a first predetermined condition associated with the first reading means; and
- the second reading means can read the second readable means if the second reading means meets at least a second predetermined condition associated with the second reading means.

The first and second predetermined conditions prevent the first and second readable means from being read inappropriately. This is because, when the first and second readable means have to be read simultaneously, the first and second predetermined conditions can be selected so as to prevent the inappropriate reading of the first and second readable means. Other advantages of the machine according to the invention will be made clear subsequently in the description.

According to optional characteristics of the machine:

The first reading means is of the radio wave type and meets the first predetermined condition associated with the first reading means if the first reading means is able to send a radio wave reading signal with a power greater than or equal to a first predetermined reading power. Thus, for example, the first reading means meets the first predetermined condition associated with the first reading means if the first reading means is located at a distance less than or equal to a first predetermined reading distance associated with the first reading means relative to the first identification means.

In a variant, the first reading means meets the first predetermined condition associated with the first reading means if the radio wave reading signal has a first predetermined reading frequency compatible with a first receiving frequency of the first readable means.

The second reading means is of the radio wave type and meets the second predetermined condition associated with the second reading means if the second reading means is able to send a radio wave reading signal with a power greater than or equal to a second predetermined reading power. Similarly, for example, the second reading means meets the second predetermined condition associated with the second reading means if the second reading means is located at a distance less than or equal to a second predetermined reading distance associated with the second reading means relative to the second identification means.

In a variant, the second reading means meets the second predetermined condition associated with the second reading means if the radio wave reading signal has a second predetermined reading frequency compatible with a second receiving frequency of the second readable means.

According to an optional characteristic, the machine comprises first and second means of adjusting the power of the first and second reading signals respectively.

Advantageously, the machine comprises first and second activation means for activating first and second means to be activated respectively, the first and second activation means being arranged in such a way that:
- the first activation means can activate the first means to be activated if the first activation means meets at least a first predetermined condition associated with the first activation means; and
- the second activation means can activate the second means to be activated if the second activation means meets at least a second predetermined condition associated with the second activation means.

According to optional characteristics of the machine:
- The first activation means is of the radio wave type and meets the first predetermined condition associated with the first activation means if the first activation means is able to send a radio wave activation signal with a power greater than or equal to a first predetermined activation power. Thus, for example, the first activation means meets the first predetermined condition associated with the first activation means if the first activation means is located at a distance less than or equal to a first predetermined activation distance associated with the first activation means relative to the first means to be activated, for example the first identification means.
- In a variant, the first activation means meet the first predetermined condition associated with the first activation means if the radio wave activation signal has a first predetermined activation frequency compatible with a first receiving frequency of the first means to be activated.

The second activation means is of the radio frequency type and meets the second predetermined condition associated with the second activation means if the second activation means is able to send a radio wave activation signal with a power greater than or equal to a second predetermined activation power. Similarly, for example, the second activation means meets the second predetermined condition associated with the second activation means if the second activation means is located at a distance less than or equal to a second predetermined activation distance associated with the second activation means relative to the second means to be activated, for example the second identification means.

In a variant, the second activation means meets the second predetermined condition associated with the second activation means if the radio wave activation signal has a second predetermined activation frequency compatible with a second frequency of the second means to be activated.

According to an optional characteristic, the machine comprises first and second means of adjusting the power of the first and second activation signals respectively.

The invention also proposes a vehicle comprising at least one tyre and comprising a plurality of predetermined spatial zones, in which each predetermined spatial zone comprises first identification means for identifying the spatial zone and each tyre comprises second identification means for identifying the tyre, each tyre being located in a single predetermined spatial zone of the vehicle, the first and second identification means being arranged in such a way that:
  the first identification means is readable if the first identification means meets at least a first predetermined condition associated with the first identification means; and
  the second identification means is readable if the second identification means meets at least a second predetermined condition associated with the second identification means.

Because of the first and second predetermined conditions, the first and second identification means cannot be read inappropriately. This is so because, if the first and second identification means have to be read simultaneously, the first and second predetermined conditions can be selected so as to prevent the inappropriate reading of the first and second identification means. Other advantages of the vehicle according to the invention will be made clear subsequently in the description. According to optional characteristics of the vehicle:
  The first identification means is of the radio wave type and meets the first predetermined condition associated with the first identification means if the first identification means is able to receive a radio wave reading signal with a power greater than or equal to a first predetermined identification power.
  In a variant, the first identification means meets the first predetermined condition associated with the first identification means if the first identification means is able to receive a radio wave reading signal at a first predetermined reading frequency.
  The second identification means is of the radio wave type and meets the second predetermined condition associated with the second identification means if the second identification means is able to receive a radio wave reading signal with a power greater than or equal to a second predetermined identification power.
  In a variant, the second identification means meets the second predetermined condition associated with the second identification means if the second identification means is able to receive a radio wave reading signal at a second predetermined reading frequency.

The invention also proposes a method of updating a database for managing a fleet of at least one vehicle when a tyre to be replaced is replaced, by means of a handling machine as defined above, with a replacement tyre on a vehicle as defined above, comprising a plurality of predetermined spatial zones, the database comprising an identifier of each tyre of the vehicle and an identifier of each predetermined spatial zone, the identifier of each tyre of the vehicle being associated with the identifier of a predetermined spatial zone of the vehicle in the database, as follows:
  an identifier of the spatial zone containing the tyre to be replaced or the replacement tyre is determined when the first predetermined conditions associated with the first reading means and the first identification means are met;
  an identifier of the tyre to be replaced or the replacement tyre is determined when the second predetermined conditions associated with the second reading means and the second identification means are met;
  the association in the database between the identifier of the spatial zone containing the tyre to be replaced or the replacement tyre and the identifier of the tyre to be replaced or the replacement tyre is updated if at least the first and second predetermined conditions are met simultaneously at least once.

If only the first predetermined conditions, or only the second predetermined conditions, are met, the association between the identifiers cannot be updated in the database. The simultaneous verification of the predetermined conditions is therefore necessary for the updating of the association between the identifier of the zone containing the tyre to be replaced or the replacement tyre and the identifier of the tyre to be replaced or the replacement tyre.

If the first and second predetermined conditions are met in a sequential way, this is insufficient, because it does not guarantee that the tyre to be replaced or the replacement tyre is associated with the zone containing the tyre to be replaced or the replacement tyre. Thus the updating method is more robust and the database is more reliable.

The handling machine and the vehicle according to the invention can be used, notably, to automatically update the database. The handling machine enables to replace excessively heavy and bulky tyres to be replaced manually, in the case of tyres for civil engineering vehicles for example. Therefore the replacements do not necessarily require the availability of the operator responsible for recording tyre replacements. Thus, the database is updated automatically and in real time. This automation makes the updating method more robust and makes the database more reliable.

It may also be necessary for other conditions to be met in order to update this association. These conditions can be checked during steps following or preceding the step in which the first and second predetermined conditions are met simultaneously at least once.

Furthermore, the wear on the tyres of a single civil engineering vehicle differs from one tyre to another. This difference in wear is greater than in other types of vehicle. Replacement is therefore not simply a matter of replacing a worn tyre with a new one, but may sometimes consist in interchanging a plurality of tyres having different degrees of wear on the same vehicle. The method according to the invention can also be used to update the database when replacements of this kind are carried out.

It is also impossible to update the database accidentally.

Preferably, the association in the database between the identifier of the spatial zone containing the tyre to be replaced or the replacement tyre and the identifier of the tyre to be replaced or the replacement tyre is updated if only the second predetermined conditions are met in the step which directly follows a step in which at least the first and second predetermined conditions are met simultaneously at least once.

A step directly follows another step if neither of the first and second predetermined conditions has been met between said steps.

In this embodiment, this implies that the tyre to be replaced has been removed from the vehicle. It is therefore possible to update the database in order to record that the tyre to be replaced is no longer in the zone in which the tyre to be replaced or the replacement tyre was located.

Preferably, the association in the database between the identifier of the spatial zone containing the tyre to be replaced or the replacement tyre and the identifier of the tyre to be replaced or the replacement tyre is updated if only the second predetermined conditions are met in the step which directly precedes a step in which at least the first and second predetermined conditions are met simultaneously at least once.

A step directly precedes another step if neither of the first and second predetermined conditions has been met between said steps.

In this embodiment, this implies that the replacement tyre has been fitted on the vehicle. It is therefore possible to update the database in order to record that the replacement tyre is, from this point onwards, in the zone in which the tyre to be replaced or the replacement tyre is located.

BRIEF DESCRIPTION OF THE DRAWINGS

The invention will be more clearly understood from the following description which is provided solely by way of non-limiting example and which refers to the drawings, in which:

FIG. 1 is a schematic view of a vehicle according to a first embodiment of the invention;

FIGS. 2A, 2B, 2C and 2D are views in axial section of tyres of the vehicle of FIG. 1 according to a number of variants;

FIGS. 7A to 7H and 8A to 8H show a number of steps of a method of updating a database according to a first embodiment of the invention;

FIGS. 9A to 9K and 10A to 10K show a number of steps of a method of updating a database according to a second embodiment of the invention.

DETAILED DESCRIPTION OF EMBODIMENTS OF THE INVENTION

Figure 3:
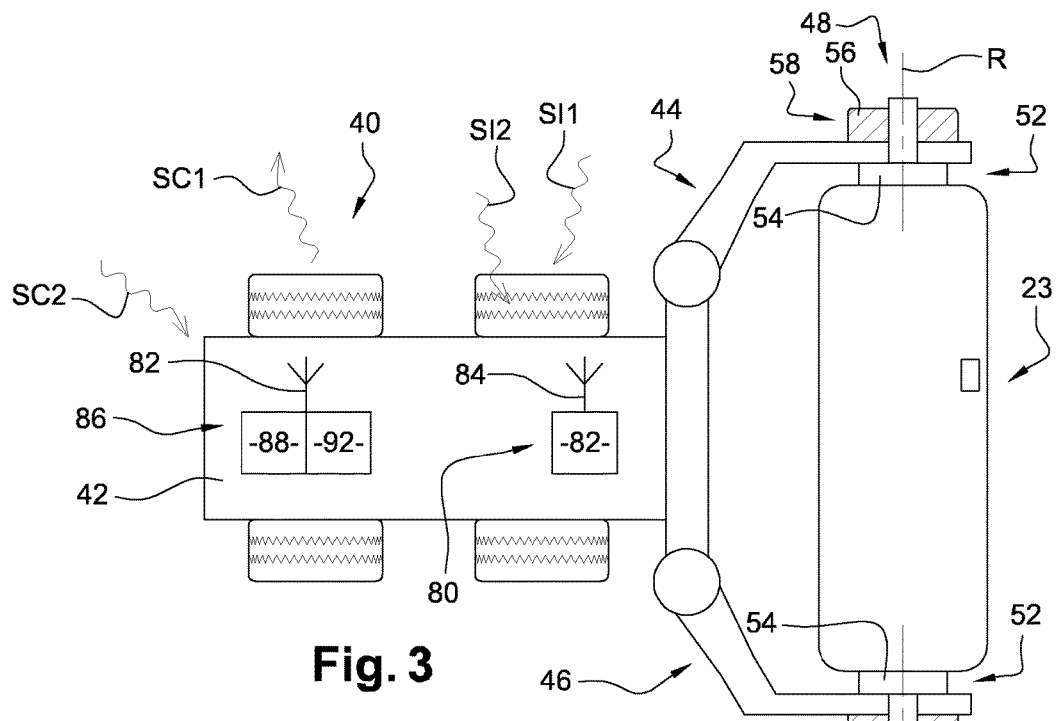
FIG. 3 is a schematic view of a handling machine according to the invention.

FIG. 1 shows a vehicle according to a first embodiment of the invention, indicated by the general reference 10. In the drawings, the axes X, Y and Z are represented as orthogonal to each other, corresponding to the usual longitudinal (X), transverse (Y) and vertical (Z) orientations of a vehicle. The vehicle 10 is of a civil engineering type, also known as a rigid tipper or rigid dumper.

The vehicle 10 comprises a body 12. The vehicle 10 also comprises first and second axles T1, T2, located at the front and back of the vehicle 10 respectively, and mounted rotatably on the body 12. Each axle T1 and T2 comprises two opposite sides identified as T1A, T1B and T2A, T2B respectively, located one on each side of the transverse median plane of the vehicle parallel to the directions X, Z. In the following text, the "right" and "left" sides are referred to as seen when viewed in the direction from the axle T2 towards the axle T1. Each of the left side T1A and right side T1B of the axle T1 comprises a tyre, identified as P1A and P1B respectively. Each of the left side T2A and right side T2B comprises two tyres, identified as P2A1, P2A2 and P2B1, P2B2 respectively. Each tyre P2A1, P2A2 is farther from the transverse median plane than the tyre P2A2, P2B2 respectively. Each side of the axle T2 therefore has two positions, 1 and 2. Each position 1 of the left and right sides carries the tyre P2A1 and P2B1 respectively. Each position 2 of the left and right sides carries the tyre P2A2 and P2B2 respectively. Preferably, all the tyres are identical. In a variant, the tyres have different sculptures or structures, depending on their use.

The vehicle 10 is divided into a plurality of spatial zones Z1, Z2, Z3, Z4 delimited by the broken lines in FIG. 1. Zone Z1 comprises the tyre P1A, zone Z2 comprises the tyre P1B, zone Z3 comprises the tyres P2A1, P2A2, and zone Z4 comprises the tyres P2B1, P2B2. The vehicle 10 further comprises identification means M1, M2, M3, M4 for identifying each zone Z1, Z2, Z3, Z4 respectively. The means M1-M4 are arranged so as to be readable if the means M1-M4 meet a predetermined condition associated with the means M1-M4. The means M1-M4 are of the radio wave type and meet the predetermined condition associated with the means M1-M4 if the means M1-M4 are able to receive a radio wave reading signal with a power greater than or equal to a predetermined identification power. Each of the means M1-M4 comprises a passive transponder 14. In a variant, each transponder 14 is of an active or semi-passive type. An active or semi-passive transponder has independent internal power supply means. An active transponder can also transmit data spontaneously without external excitation. A passive transponder responds only to external excitation which also supplies it with its operating power.

The radio wave bands used by the transponders are chosen from the LF, MF, HF, VHF and UHF bands.

FIGS. 2A-2D show a number of variants of one of the tyres of the vehicle of FIG. 1, in this case the tyre P1A. The tyre P1A comprises a tread 16 and two sidewalls 18 located one on each side of a median axial plane M of the tyre, only one of the sidewalls being shown in FIGS. 2A-2D. The tyre P1A further comprises two circular bead cores 20 located at each axially inner end of each sidewall 18. The tread 16 also has sculptures 22, notably a circumferential groove.

In the variants shown in FIGS. 2A to 2C, the tyre P1a comprises means 23 for identifying the tyre P1A, comprising a passive transponder 24. In a variant, the transponder 24 is of an active or semi-active type.

As shown in FIG. 2A, the transponder 24 is located in the circumferential groove 22 and is fixed by gluing or mechanical fastening.

In a variant, as shown in FIG. 2B, the transponder 24 is located on an outer face 26 of the sidewall 18 and is fixed by gluing, using a patch (not shown) or fixing hooks (not shown). In a variant, the transponder 24 can be fixed to an inner face 28 of the sidewall 18.

In a variant, as shown in FIG. 2C, the transponder 24 is embedded in the rubber of the tyre P1A. It is located in the rubber of the sidewall 18. In a variant, the transponder 24 is located in the rubber of the tread 16.

In the variant shown in FIG. 2D, the tyre P1A comprises a pressure monitoring device (Tyre Pressure Monitoring System) 30, comprising the means 23 for identifying the tyre P1A. The means 23 comprises a coil (not shown). As shown in FIG. 2D, the device 30 is located on an inner face 28 of the sidewall 18 and is fixed by gluing, using a patch 31.

In each of the illustrated variants, the identification means 23 is arranged in such a way that the identification means 23 is readable if the identification means 23 meets a predetermined condition associated with the identification means 23. The identification means 23 is of the radio wave type and meet the predetermined condition associated with the identification means 23 if the identification means 23 is able to receive a radio wave reading signal with a power greater than or equal to a predetermined identification power.

Figure 4:
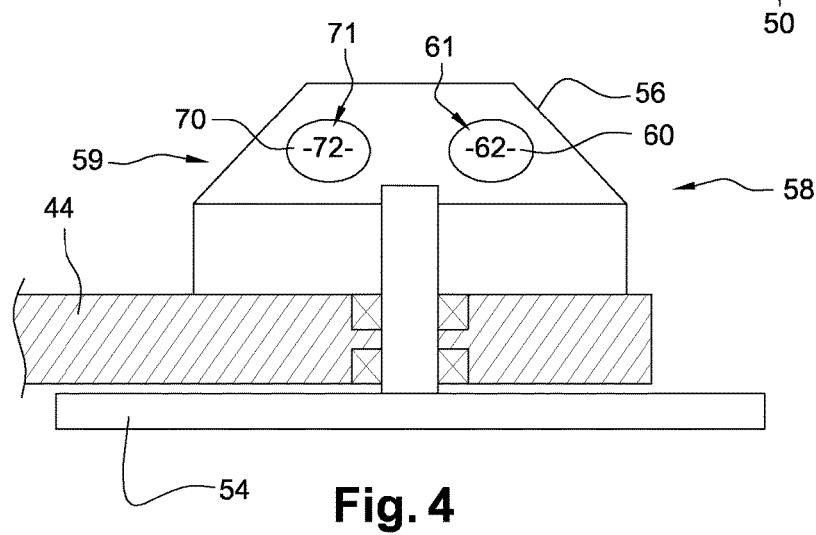
FIGS. 4 and 5 are perspective and side views, respectively, of ends of handling arms of the machine of FIG. 3.
Figure 5:
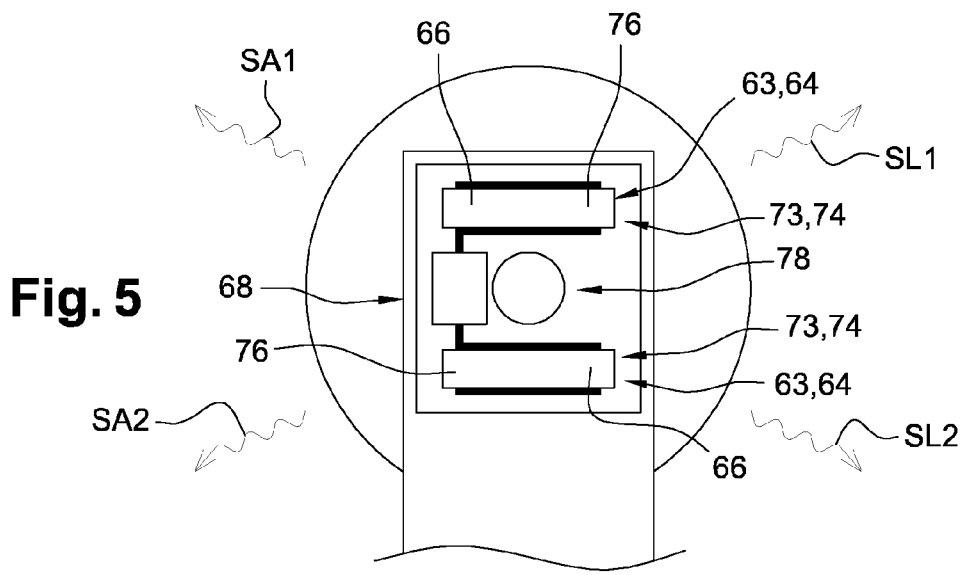

FIG. 3 shows a handling machine according to the invention, indicated by the general reference 40, and FIGS. 4 and 5 show devices and means for the operation of this machine.

The machine 40 comprises a body 42 on which are mounted two articulated tyre gripping arms 44, 46. Each arm 44, 46 has two ends 48, 50.

Each end 48, 50 has means 52 for rotating the tyre about an axis R. The means 52 comprises a motorized tyre gripping dome 54 which is rotatable about the axis R.

Each end 48, 50 further comprises a protective casing 56 for activation devices 58 and reading devices 59 for activating and reading the identification means M1-M4 of the zones Z1-Z4 and the tyre identification means 23.

The activation device 58 comprises means 60 for activating the identification means M1-M4 of the zones Z1-Z4 and means 61 for activating the tyre identification means 23. In this case, the activation means 60, 61 are common, and are indicated by the reference 62. The activation means 60, 61 are arranged in such a way that the activation means 60 can activate the identification means M1-M4 if the activation means 60 meet at least one predetermined condition associated with the activation means 60, and in such a way that the activation means 61 can activate the identification means 23 if the activation means 61 meet at least one predetermined condition associated with the activation means 61.

With reference to FIG. 5, the activation means 62 is of the radio wave type and comprises means 63 for generating a radio wave signal SA1 for activating the identification means M1-M4 and means 64 for generating a radio wave signal SA2 for activating the identification means 23. The activation means 60 meets the predetermined condition associated with the activation means 60 if the activation means 60 is able to send the activation signal SA1 with a power greater than or equal to a predetermined activation power. Similarly, the activation means 61 meets the predetermined condition associated with the activation means 61 if the activation means 61 is able to send the activation signal SA2 with a power greater than or equal to a predetermined activation power. The means 63, 64 comprises two antennae 66.

In this case, each antenna 66 comprises an air coil or a coil having a core of magnetic material such as ferrite. Each antenna can transmit a carrier wave which is frequency modulated around 125 kHz. The device 58 comprises means 68 for monitoring the activation signals SA1, SA2. The means 68 comprises means for frequency modulating the activation signals SA1, SA2, means for amplifying the activation signals SA1, SA2, and means for adjusting the power of the activation signals SA1, SA2.

The reading device 59 comprises means 70 for reading the identification means M1-M4 of the zones Z1-Z4 and means 71 for reading the tyre identification means 23. In this case, the reading means 70, 71 are common, and are indicated by the reference 72. The reading means 70, 71 are arranged in such a way that the reading means 70 can read the identification means M1-M4 if the reading means 71 meets at least one predetermined condition associated with the reading means 70, and in such a way that the reading means 71 can read the identification means 23 if the reading means 71 meets at least one predetermined condition associated with the reading means 71.

The reading means 72 is of the radio wave type and comprises means 73 for generating a radio wave signal SL1 for reading the identification means M1-M4 and means 74 for generating a radio wave signal SL2 for reading the identification means 23. The reading means 70 meets the predetermined condition associated with the reading means 70 if the reading means 70 is able to send the reading signal SL1 with a power greater than or equal to a predetermined reading power. Analogously, the reading means 71 meets the predetermined condition associated with the reading means 71 if the reading means 71 is able to send the reading signal SL2 with a power greater than or equal to a predetermined reading power. The predetermined activation power of the means 60, 61 is substantially equal to the predetermined reading power of the means 70, 71.

In this case, the means 73, 74 comprises two antennae 76. The device 59 comprises means 78 for monitoring the reading signals SL1, SL2. The means 78 comprises means for frequency modulating the reading signals SL1, SL2, means for amplifying the reading signals SL1, SL2, and means for adjusting the power of the reading signals SL1, SL2.

The machine 40 further comprises means 80 for communication between the machine 40 and each vehicle 10 and/or tyre. The means 80 comprise means 82 for receiving data signals SI1, SI2 received, respectively, from the identification means M1-M4 and the identification means 23. In this case, the means 82 comprise a low-frequency antenna 84.

The machine 40 further comprises means 86 for communication between the machine 40 and a remote communication centre comprising a database B for managing a fleet of vehicles 10. The communication means 86 comprises means 88 for sending a data signal SC1 from the machine 40 towards the centre, and means 90 for receiving a data signal SC2 sent from the centre C towards the machine 40. In this case, the means 88, 90 comprise a high-frequency radio wave antenna 92.

Figure 6:
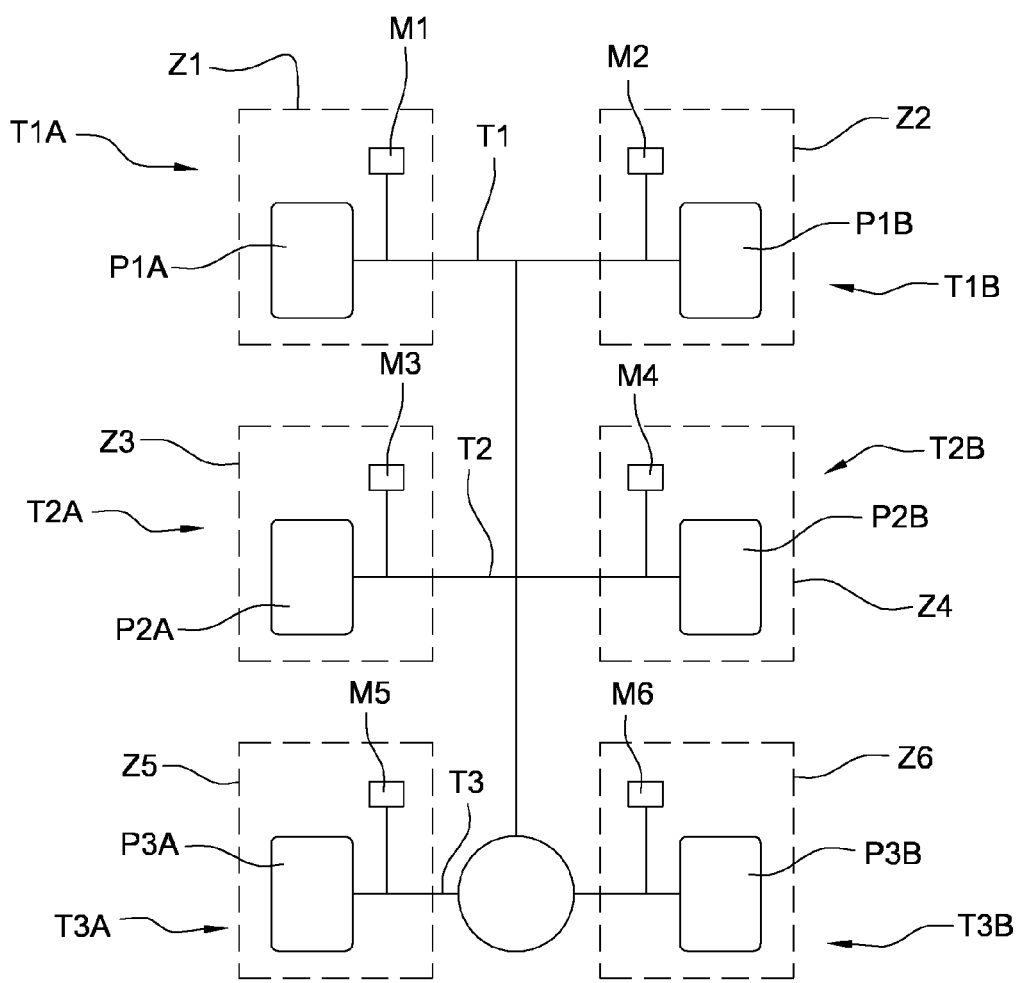
FIG. 6 is a schematic view of a vehicle according to a second embodiment of the invention.

FIG. 6 shows a vehicle according to a second embodiment. Elements similar to those shown in the preceding figures are denoted by identical references.

Unlike the vehicle 10 according to the first embodiment, the vehicle 10 comprises first, second and third axles T1, T2, T3, mounted rotatably on the body 12. The axle T3 comprises two opposite sides identified as T3A, T3B respectively, located one on each side of the transverse median plane of the vehicle parallel to the directions X, Z. Each of the left sides T1A, T2A and T3A and the right sides T1B, T2B and T3B of the axles T1, T2, T3 comprises a tyre, identified as P1A, P2A and P3A and P1B, P2B and P3B respectively.

The vehicle 10 is divided into a plurality of spatial zones Z1, Z2, Z3, Z4, Z5, Z6, delimited by the broken lines in FIG.

6. Each zone Z1, Z2, Z3, Z4, Z5 and Z6 comprises the tyre P1A, P1B, P2A, P2B, P3A and P3B respectively. The vehicle 10 further comprises identification means M1, M2, M3, M4, M5 and M6 for identifying each zone Z1, Z2, Z3, Z4, Z5 and Z6 respectively. Each of the means M1-M6 comprises a passive transponder 14. In a variant, each transponder 14 is of an active or semi-active type.

A method of managing a database B will now be described according to a first embodiment with reference to FIGS. 7A to 7F and 8A to 8F. These figures show different steps of the replacement of the tyre to be replaced P1A of the vehicle 10 with a replacement tyre PC, according to the first embodiment.

FIG. 7A shows the vehicle 10 comprising the tyre P1A to be replaced, the replacement tyre PC and the handling machine 40.

FIG. 8A shows part of the database B relating to the vehicle 10 and the machine 40. In a column E0, the database B contains a time indicator, or "timestamp", TS. It should be noted that a timestamp is a computer time marker corresponding to the number of seconds elapsed since 1 Jan. 1970. For example, the value 1274436000 corresponds to the date 21 May 2010 at 12 hours, 0 minutes and 0 seconds. In a column E1, the database B contains the identifier Z1-Z4 of each zone Z1-Z4 of the vehicle 10 and the identifier of each tyre, if they have been activated and if they have been read by the machine 40. The columns E0, E1 relate to the handling machine 40.

In a column V0, the database B contains the same timestamp TS as the column E0.

In columns V1-V4, the database B contains data relating to the spatial zones Z1-Z4 and data relating to the tyres of the vehicle 10. Each data element relating to each tyre of the vehicle 10 is associated with a single spatial zone Z1-Z4 of the vehicle 10. In this case, the data comprise the identifiers of the zones Z1-Z4 and of the tyres of the vehicle 10. Each column V1-V4 comprises the identifier or identifiers of the tyre or tyres located in the corresponding zone Z1-Z4. In the case of the zones Z3, Z4, the inner positions POS1 and outer positions POS2 are recorded in the form POS1/POS2, where POS1 denotes the position farthest from the median transverse plane of the vehicle and POS2 denotes the position nearest to the median transverse plane of the vehicle.

In a column V5, the database B contains operations carried out on the vehicle 10 and determined by means of an algorithm for updating the database B as a function of the successive statuses of the other columns of the database B. These predetermined operations are represented as follows:
POSX, ZY→PW means that the tyre PW has been removed from position X of zone ZY of the vehicle, and
PW→POSX, ZY means that the tyre PW has been fitted in position X of zone ZY of the vehicle.
The columns V0-V5 relate to the vehicle 10.

During this process, the machine 40 activates and reads the identifiers of the spatial zones Z1-Z4, of the tyres of the vehicle 10, and of the replacement tyre PC.

The identifier of the spatial zone Z1-Z4 where the replacement has been carried out is determined if first predetermined conditions are met. These first conditions comprise the conditions associated with the reading means 70 and the identification means M1-M4. This spatial zone is called the working zone. These first predetermined conditions are met if the identifier of the working spatial zone is received. In other words, the first predetermined conditions are met if the power of the signals SA1 and SL1 is sufficient to read the identification means M1-M4. In addition to the conditions associated with the reading means 70 and with the identification means M1-M4, in the illustrated example, the first predetermined conditions comprise the predetermined condition associated with the means 60 for activating the identification means M1-M4.

Similarly, the identifier 23 of the tyre to be replaced or of the replacement tyre is determined if second predetermined conditions are met. These second conditions comprise the conditions associated with the reading means 71 and with the identification means 23. These second predetermined conditions are met if the identifier of the tyre to be replaced or of the replacement tyre is received. In other words, the second predetermined conditions are met if the power of the signals SA2 and SL2 is sufficient to activate and read the identification means 23. In addition to the conditions associated with the reading means 71 and with the identification means 23, in the illustrated example, the second predetermined conditions comprise the predetermined condition associated with these means 61 for activating the identification means 23.

In FIG. 8A, column E0 contains a time indicator corresponding to the start time of the process. The identification means M1-M4 of the zones Z1-Z4 and the identification means 23 of each tyre of the vehicle 10 and of the tyre PC do not meet the first and second predetermined conditions. Consequently, no identifier of a spatial zone or a tyre is received, and column E1 is empty. Columns V1-V4 contain the last known identifiers for the vehicle 10. Since no step has been carried out previously, column V5 is empty.

As shown in FIG. 7B, the machine 40 enters the zone Z1, called the working zone, and grasps the tyre P1A.

Initially, since the first predetermined conditions are met, the identification means M1 of the working spatial zone Z1 is activated by the activation means 60, and the identifier Z1 of the spatial zone Z1 is determined by the reading means 70. For this purpose, the means 63, 73 generate the activation signal SA1 and reading signal SL1, respectively, to be sent to the identification means M1 of the zone Z1.

Simultaneously, since the second predetermined conditions are met, the identification means 23 of the tyre to be replaced PA1 is activated, by the activation means 61, and the identifier P1A of the tyre to be replaced P1A is determined by the reading means 71. For this purpose, the means 61, 71 generates the activation signal SA2 and the reading signal SL2, respectively, to be sent to the identification means 23 of the tyre to be replaced P1A. In return, the means M1 and 23 send the identifiers Z1 and P1A towards the means 82 in the form of the signals SI1, SI2.

The database is updated, using updating data comprising the identifier of the tyre to be replaced PA1 and the identifier of the working spatial zone Z1. The identifiers Z1 and P1A are then transmitted, by the means 86, from the machine 40 to the database B, in the form of a signal SC1. As shown in FIG. 8B, column E1 comprises the identifiers Z1, PA1 of the zone Z1 and of the tyre P1A.

The tyre P1A is then removed from the vehicle 10 as shown in FIG. 7C. As shown in FIG. 8C, column E1 still contains the identifier P1A, but no longer contains the identifier Z1. This is because only the second predetermined conditions are now met, and not the first predetermined conditions. The step shown in FIG. 7C, in which only the second predetermined conditions are met, directly follows the step shown in FIG. 7B, in which the first and second predetermined conditions are met simultaneously at least once. The database B is therefore updated, using updating data comprising, notably, data relating to the association between the identifier Z1 of the working spatial zone and the identifier of the tyre to be replaced P1A. The algorithm controlling the updating of the database has therefore detected that the tyre P1A is no longer associated with the working zone Z1. Column V1 therefore contains 0, indicating the absence of a tyre in the working zone Z1. Column V5 contains POS1, Z1→P1A, indicating that the tyre P1A has been removed from position 1 of zone Z1 of the vehicle 10.

As shown in FIG. 7D, the tyre P1A to be replaced has been moved out of the working zone Z1 of the vehicle 10 towards an intermediate storage zone ZI. The intermediate storage zone ZI is located at a distance from the vehicle 10 such that the identification means 23 of the tyre P1A can no longer be activated or read inappropriately by the activation means 61 and reading means 71 of the machine 40 simultaneously with the identification means 23 of another tyre. In FIG. 7D, neither the first nor the second predetermined conditions are met. The database B is then updated, using updating data. Column E1 is therefore empty.

As shown in FIG. 7E, the replacement tyre PC is grasped. Since the first predetermined conditions are met, the identification means 23 of the replacement tyre PC is activated and an identifier PC is determined. The database B is then updated, using updating data comprising the identifier PC associated with the machine 40. As shown in FIG. 8E, column E2 therefore contains the identifier PC.

As shown in FIG. 7F, the machine 40 re-enters the zone Z1, and the tyre to be replaced P1A is replaced by the replacement tyre PC on the vehicle 10. As the first predetermined conditions are met, the identification means M1 of the working spatial zone Z1 is activated and the identifier Z1 is determined. Simultaneously, since the second predetermined conditions are also met, the identification means 23 of the replacement tyre PC is activated and the identifier PC is determined. The database is updated, using updating data comprising the identifier of the replacement tyre PC and the identifier of the working spatial zone Z1. As shown in FIG. 8F, column E1 comprises the identifiers Z1 and PC.

Figure 7G:
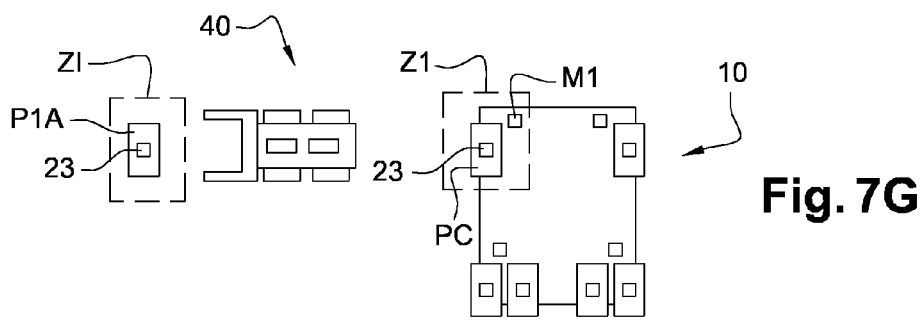
Figure 8G:
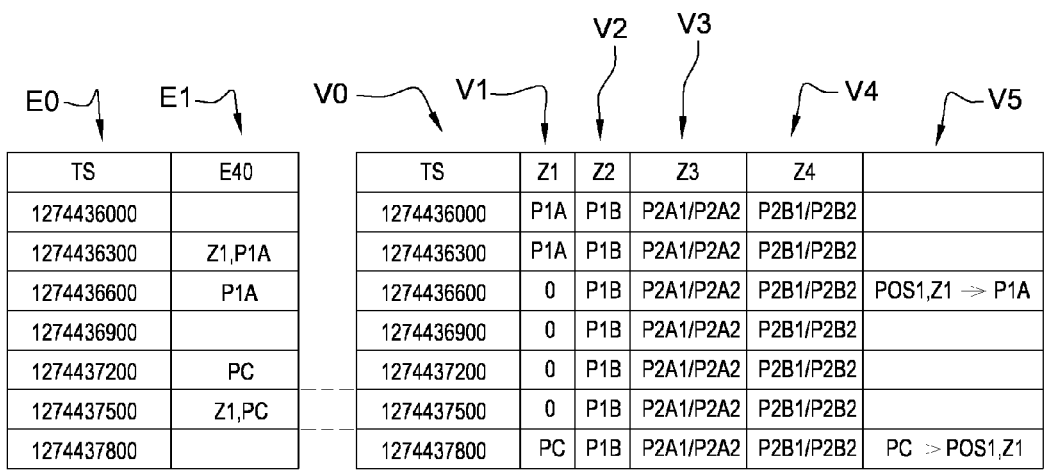

As shown in FIG. 7G, the machine 40 leaves the zone Z1; in other words, it moves into a position in which the first predetermined conditions are not met. Furthermore, the second predetermined conditions are no longer met. The step shown in FIG. 7F, in which both the first and the second predetermined conditions are met simultaneously at least once, directly precedes the step shown in FIG. 7G in which neither the first nor the second predetermined conditions are met. The database B is then updated, using updating data comprising data relating to, notably, the association between the identifier of the working spatial zone Z1 and the identifier of the replacement tyre PC. As shown in FIG. 8G, the algorithm controlling the updating of the database has therefore detected that the tyre PC is associated from this point onwards with the working zone Z1. Column V1 therefore contains the identifier PC from this point onwards, indicating the association of the tyre PC with the working zone Z1. Column V5 contains PC→POS1, Z1, indicating that the tyre PC has actually been fitted in position 1 of zone Z1 of the vehicle 10.

FIG. 7H shows the machine 40 moving the tyre P1A from its intermediate storage zone ZI towards a final storage zone ZF. The database is then updated, using updating data. Since the second condition is met, column E1 comprises the identifier P1A as shown in FIG. 8H.

A method of managing the database B will now be described according to a second embodiment, with reference to FIGS. 9A to 9K and 10A to 10K. These figures show different steps of the replacement of the tyre to be replaced P2A2 with a replacement tyre PC. The process according to the second embodiment will be described in a simplified way by comparison with the process according to the first embodiment.

FIG. 9A shows the vehicle 10 comprising the tyre P2A2 to be replaced, the replacement tyre PC and the handling machine 40. Columns V1-V4 contain the last known statuses for the vehicle 10. Since no operation has been carried out previously, column V5 is empty.

As shown in FIG. 9B, the machine 40 enters the zone Z3, called the working zone, and grasps the tyre P2A1. This tyre is then treated as the tyre to be replaced. Since the first predetermined conditions are met, the identification means M3 of the working spatial zone Z3 is activated and the identifier Z3 is determined. Simultaneously, since the second predetermined conditions are also met, the identification means 23 of the tyre to be replaced P2A2 is activated, that of the tyre P2A1 is also activated, and the identifiers P2A1 and P2A2 are determined. The database is then updated, using updating data comprising the identifiers of the tyres P2A1, P2A2 and the identifier of the working spatial zone Z3. As shown in FIG. 10B, column E1 contains the identifiers of the zone Z3 and of the tyres P2A1, P2A2.

The tyre P2A2 is then removed from the vehicle 10 as shown in FIG. 9C. As shown in FIG. 10C, since the second predetermined conditions are met for the tyre P2A1, column met E1 still contains the identifier P2A1, but no longer contains the identifiers P2A2 and Z3. This is because, in this step, the first predetermined conditions are not and the second predetermined conditions are no longer met for the tyre P2A2. The step shown in FIG. 9C, in which only the second predetermined conditions are met for the tyre P2A1, directly follows the step shown in FIG. 9B in which the first and second predetermined conditions are met simultaneously at least once. The database B is therefore updated, using updating data comprising, notably, data relating to the association between the identifier Z3 of the working spatial zone and the identifier of the tyre to be replaced P2A1. The algorithm controlling the updating of the database has therefore detected that the tyre P2A1 is no longer associated with the working zone Z3. Column V3 therefore contains 0/P2A2, indicating the absence of a tyre in position 1 of the working zone Z3. Column V5 contains POS1, Z3→P2A1, indicating that the tyre P2A1 has been removed from position 1 of zone Z3 of the vehicle 10.

As shown in FIG. 9D, the tyre P2A1 to be replaced has been moved out of the working zone Z3 of the vehicle 10 towards a first intermediate storage zone ZI1. The first intermediate storage zone ZI1 is located at a distance from the vehicle 10 such that the identification means 23 of the tyre P2A1 can no longer be activated or read inappropriately by the activation means 61 and reading means 71 of the machine 40 simultaneously with the identification means 23 of another tyre. The machine 40 then re-enters the zone Z3 and grasps the tyre P2A2.

The tyre P2A2 is treated from this point onwards as the tyre to be replaced. Since the first predetermined conditions are met, the identification means M3 of the working spatial zone Z3 is activated and the identifier Z3 is determined. Simultaneously, since the second predetermined conditions for the tyre P2A2 are met, the identification means 23 of the tyre to be replaced P2A2 is activated, and the identifier P2A2 is determined. The database is updated using updating data comprising the identifier of the tyre to be replaced P2A2 and the identifier of the working spatial zone Z3. As shown in FIG. 10D, column E1 comprises the identifiers of the zone Z3 and of the tyre to be replaced P2A2.

The tyre P2A2 is then removed from the vehicle 10 as shown in FIG. 9E. As shown in FIG. 10E, since the second predetermined conditions are met for the tyre P2A2, column E1 still contains the identifier P2A2, but no longer contains the identifier Z3. The step shown in FIG. 9E, in which only the second predetermined conditions are met, directly follows the step shown in FIG. 9D in which the first and second predetermined conditions are met simultaneously at least once. The database B is therefore updated, using updating data comprising, notably, data relating to the association between the identifier Z3 of the working spatial zone and the identifier of the tyre to be replaced P2A2. The algorithm controlling the updating of the database has therefore detected that the tyre P2A2 is no longer associated with position 2 of the working zone Z3. Column V3 therefore contains 0/0, indicating the absence of a tyre in positions 1 and 2 of the working zone Z3. Column V5 contains POS2, Z3→P2A2, indicating that the tyre P2A2 has been removed from position 2 of zone Z3 of the vehicle 10.

As shown in FIG. 9F, the tyre P2A2 to be replaced has been moved from the vehicle 10 towards a second intermediate zone ZI2 for the storage of the tyre P2A2. The second intermediate storage zone ZI2 is located at a distance from the vehicle 10 and from the zone ZI1 such that the identification means 23 of the tyre P2A2 can no longer be activated or read inappropriately by the activation means 61 and reading means 71 of the machine 40 simultaneously with the identification means 23 of another tyre.

The replacement tyre PC is then grasped. Since the second predetermined conditions are met, the identification means 23 of the replacement tyre PC is activated and the identifier PC is determined. The database is then updated, using updating data. As shown in FIG. 10F, column E1 contains the identifier PC of the tyre PC.

As shown in FIG. 9G, the machine 40 re-enters the zone Z3, and the tyre to be replaced P2A2 is replaced with the replacement tyre PC on the vehicle 10. Since the first predetermined conditions are met, the identification means M3 of the working spatial zone Z3 is activated and the identifier Z3 is determined. Simultaneously, since the second predetermined conditions are met, the identification means 23 of the tyre PC is activated and the identifier PC is determined. The database is updated, using updating data comprising the identifier of the replacement tyre PC and the identifier of the working spatial zone Z3. As shown in FIG. 10G, column E1 comprises the identifiers Z3 and PC associated with each other.

Figure 9H:
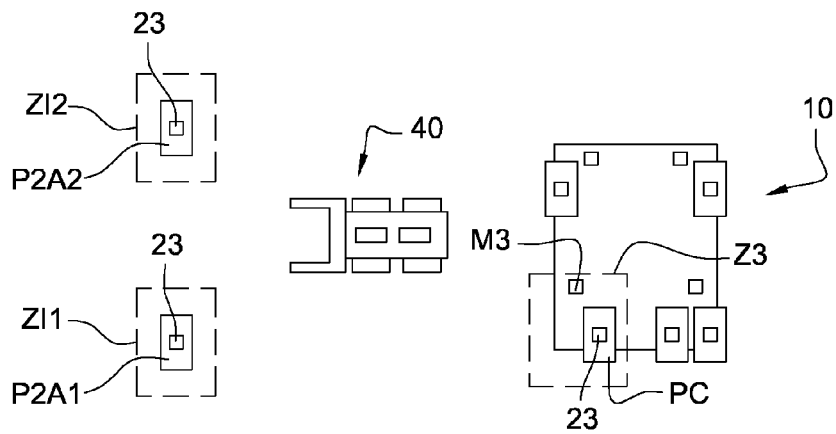
Figure 10H:
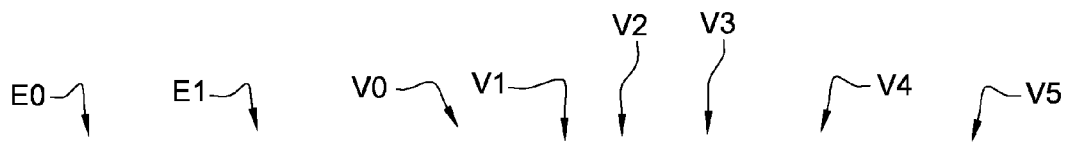

As shown in FIG. 9H, the machine 40 leaves the zone Z3 and moves towards the intermediate storage zone ZI2. The first and the second predetermined conditions are met simultaneously at least once in the step shown in FIG. 9G, which directly precedes the step 9H, in which neither the first nor the second predetermined conditions are met. The database is then updated, using updating data comprising, notably, data relating to the association between the identifier Z3 of the working spatial zone and the identifier of the replacement tyre PC. As shown in FIG. 10H, the algorithm controlling the updating of the database has therefore detected that the tyre PC is associated from this point onwards with the working zone Z3. Column V1 therefore contains the identifier PC from this point onwards, indicating the association of the tyre PC with the working zone Z3. Column V5 contains PC→POS2, Z3, confirming that the tyre PC has actually been fitted in position 2 of zone Z3 of the vehicle 10.

The tyre P2A1 is then picked up in the intermediate storage zone ZI2. The tyre P2A1 is treated from this point onwards as the replacement tyre. Since the second predetermined conditions for the tyre P2A1 are met, the identification means 23 of the tyre P2A1 is activated, and the identifier P2A1 is determined. The database is then updated, using updating data. This update, shown in FIG. 10I, causes the identifier P2A1 to appear in column E1.

Figures 9I, 10I:
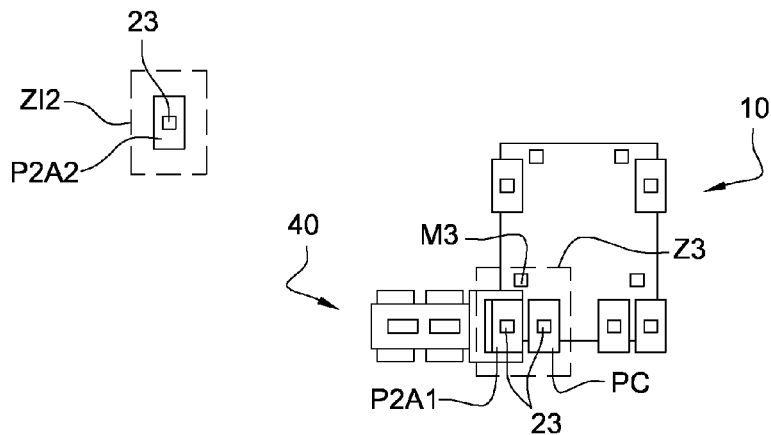

As shown in FIG. 9I, the machine 40 re-enters the zone Z3, and the tyre P2A1 is replaced on the vehicle 10. Since the first predetermined conditions are met, the identification means M3 of the working spatial zone Z3 is activated and the identifier Z3 is determined. Simultaneously, since the second predetermined conditions for the tyres P2A1 and PC are met, the identification means 23 of the tyres P2A1 and PC are activated, and the identifiers P2A1 and PC are determined. The database is then updated, using updating data comprising the identifiers Z3, P2A1 and PC. As shown in FIG. 10I, column E1 comprises the identifiers Z3, P2A1 and PC.

Figure 9J:
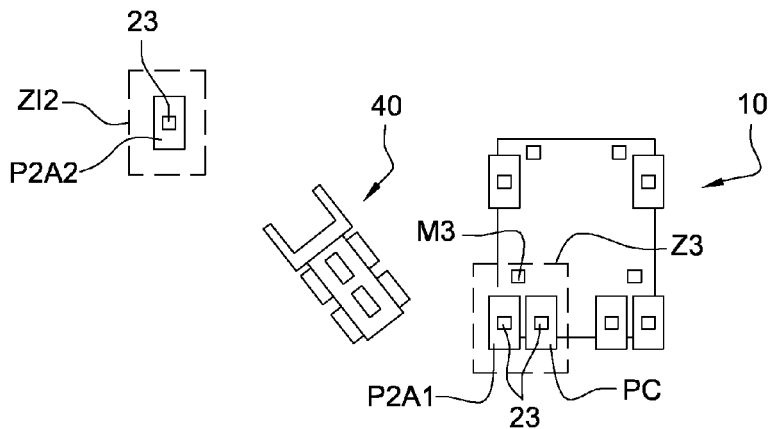
Figure 10J:
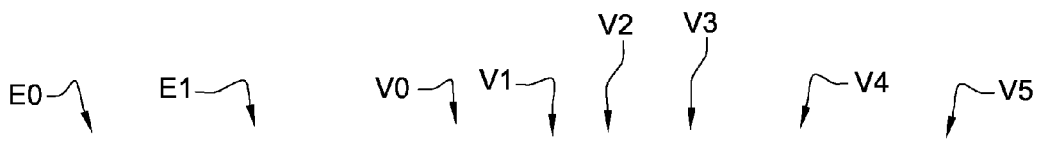

As shown in FIG. 9J, the machine 40 leaves the zone Z3. Both the first and the second predetermined conditions are met simultaneously at least once in the step shown in FIG. 9I, which directly precedes the step shown in FIG. 9J, in which neither the first nor the second predetermined conditions are met. The database is then updated, using updating data relating to the association between the identifier Z3 of the working spatial zone and the identifier of the tyre to be replaced P2A1. As shown in FIG. 10J, the algorithm controlling the updating of the database has therefore detected that the tyre P2A1 is associated from this point onwards with position 1 of the working zone Z3. Column V3 therefore contains the identifier P2A1/PC from this point onwards, indicating the association of the tyre P2A1 with position 1 of the working zone Z3. Column V5 contains P2A1→POS1, Z3, confirming that the tyre P2A1 has actually been fitted in position 1 of zone Z3 of the vehicle 10.

Figure 9K:
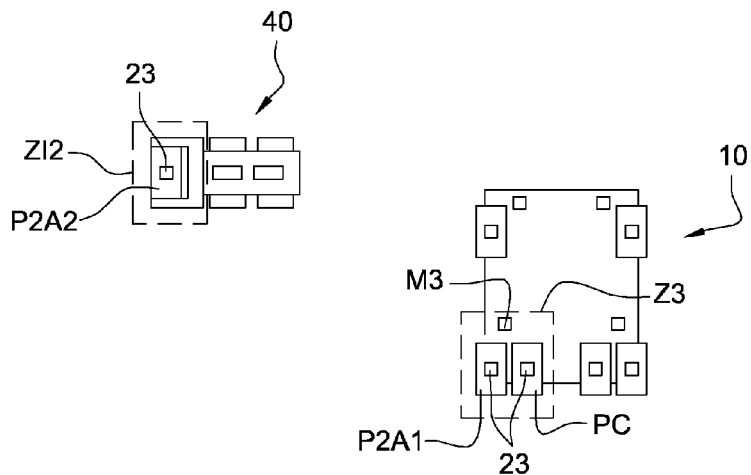
Figure 10K:
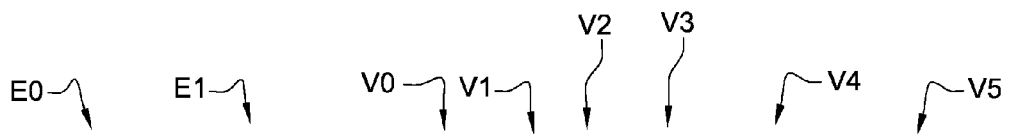

FIG. 9K shows the machine 40 moving the tyre to be replaced P2A2 from its intermediate storage zone ZI2 towards a final storage zone ZF. Since the second predetermined conditions for the tyre to be replaced P2A2 are met, the identification means 23 of the tyre P2A2 is activated, and the identifier P2A2 is determined. The database is then updated, using updating data. Column E1 comprises the identifier P2A2, as shown in FIG. 10K.

The invention is not limited to the embodiments described above.

In fact, the vehicle can include any number of zones. Each zone can include any number of tyres.

In one embodiment, the machine comprises, in addition to the means described above, or independently, first and second triggering means for triggering, respectively, the first and second activation means and/or the first and second reading means. The first and second triggering means are connected, respectively, to first and second means for measuring an indicator of the machine's speed.

The first and second triggering means for the first and second activation means are arranged in such a way that:
  the first triggering means can trigger the first activation means if the first triggering means meets at least a first predetermined condition associated with the first triggering means for the first activation means; and
  the second triggering means can trigger the second activation means if the second triggering means meets at least a second predetermined condition associated with the second triggering means for the second activation means.

The first and second triggering means for the first and second reading means are arranged in such a way that:

the first triggering means can trigger the first reading means if the first triggering means meets at least a first predetermined condition associated with the first triggering means for the first reading means; and the second triggering means can trigger the second reading means if the second triggering means meets at least a second predetermined condition associated with the second triggering means for the second reading means.

The first and second triggering means for the first and second activation means meet the first and second predetermined conditions, respectively, associated with the first and second triggering means, respectively, if the machine speed indicator is below first and second predetermined thresholds, respectively, associated with the first and second triggering means for the activation means.

The first and second triggering means for the first and second reading means meet the first and second predetermined conditions, respectively, associated with the first and second triggering means, respectively, if the machine speed indicator is below first and second predetermined thresholds, respectively, associated with the first and second triggering means for the reading means.

For example, the thresholds associated with the activation means and the reading means are all equal. The single threshold is equal to 5 km/h.

The invention claimed is:

1. A tyre handling machine comprising:
    first and second radio-wave readers configured to cause first and second transponders, respectively, to be read, the first radio-wave reader for causing reading of the first transponder located on a vehicle and the second radio-wave reader for causing reading of the second transponder located on a tyre; and
    a radio-wave communicator configured to transmit data to and receive data from a remote data center,
    wherein the first radio-wave reader is able to cause the first transponder to be read if the first radio-wave reader meets at least a first predetermined reader condition associated with the first radio-wave reader,
    wherein the second radio-wave reader is able to cause the second transponder to be read if the second radio-wave reader meets at least a second predetermined reader condition associated with the second radio-wave reader, and
    wherein the radio-wave communicator is configured to transmit first association updating information automatically to the remote data center upon a simultaneous occurrence of a reading of the first transponder caused by the first radio-wave reader and a reading of the second transponder caused by the second radio-wave reader, and to transmit second association updating information automatically to the remote data center upon a reading of only one of the first and second transponders or a failure to read any of the first and second transponders directly following the simultaneous occurrence of the reading of the first transponder and the reading of the second transponder, the first and second association updating information both including tyre-identification information and vehicle-zone information, and the remote data center storing the first and second association updating information in a tyre-management database relating to the vehicle.

2. The machine according to claim 1, wherein the first radio-wave reader meets the first predetermined reader condition if the first radio-wave reader is able to send a radio wave reading signal with a power greater than or equal to a first predetermined reading power.

3. The machine according to claim 1 or claim 2, wherein the second radio-wave reader meets the second predetermined reader condition if the second radio-wave reader is able to send a radio wave reading signal with a power greater than or equal to a second predetermined reading power.

4. The machine according to claim 1 or claim 2, further comprising first and second radio-wave activators configured to activate the first and second transponders, respectively,
    wherein the first radio-wave activator is able to activate the first transponder if the first radio-wave activator meets at least a first predetermined activator condition associated with the first radio-wave activator, and
    wherein the second radio-wave activator is able to activate the second transponder if the second radio-wave activator meets at least a second predetermined activator condition associated with the second radio-wave activator.

5. The machine according to claim 4, wherein the first radio-wave activator meets the first predetermined activator condition if the first radio-wave activator is able to send a radio wave activation signal with a power greater than or equal to a first predetermined activation power.

6. The machine according to claim 4, wherein the second radio-wave activator meets the second predetermined activator condition if the second radio-wave activator is able to send a radio wave activation signal with a power greater than or equal to a second predetermined activation power.

7. A vehicle comprising:
    a body;
    at least one tyre attached to the body;
    a plurality of first transponders located in a plurality of predetermined spatial zones of the body, with each first transponder including first identifier information for identifying a predetermined spatial zone corresponding to that first transponder, and
    at least one second transponder, each second transponder being located in or on a corresponding one of the at least one tyre, with each second transponder including second identifying information for identifying a tyre corresponding to that second transponder,
    wherein each tyre is located in a corresponding single one of the predetermined spatial zones,
    wherein each first transponder is readable if at least a first predetermined identifier condition associated with the first transponder is met,
    wherein each second transponder is readable if at least a second predetermined identifier condition associated with the second transponder is met, and
    wherein, when a simultaneous occurrence of the first predetermined identifier condition and the second predetermined identifier condition are met such that one of the first transponders and one of the at least one second transponder are read simultaneously, a first association updating operation is enabled in an remote reading and communication apparatus, and, when directly following the simultaneous occurrence there is a failure to read any of the first and second transponders or only one of the first and second transponders is read, a second association updating operation is enabled in the remote reading and communication apparatus, the first and second association updating operations updating both tyre-identification information and vehicle-zone information in a tyre-management database relating to the vehicle.

8. The vehicle according to claim 7, wherein
    the first identifier is of a radio wave type, and the first transponder meets the first predetermined identifier condition if the first transponder is able to receive a radio wave reading signal with a power greater than or equal to a first predetermined identification power.

9. The vehicle according to claim 7 or claim 8, wherein the second identifier is of a radio wave type, and
the second transponder meets the second predetermined identifier condition if the second transponder is able to receive a radio wave reading signal with a power greater than or equal to a second predetermined identification power.

10. A method of updating a database for managing a fleet of at least one vehicle when a tyre on a vehicle is replaced with a replacement tyre by use of a handling machine,
in which the vehicle includes a body; at least one tyre attached to the body; a plurality of first transponders located in a plurality of predetermined spatial zones of the body, with each first transponder including first identifier information for identifying a predetermined spatial zone corresponding to that first transponder; and at least one second transponder located in or on the at least one tyre, with each second radio-wave transponder including second identifying information for identifying a tyre corresponding to that second transponder, wherein each tyre is located in a corresponding single one of the predetermined spatial zones,
in which the handling machine includes first and second radio-wave readers configured to cause the first and second transponders, respectively, to be read; and a radio-wave communicator configured to transmit data to and receive data from a remote data center, the first and second radio-wave readers being arranged such that the first radio-wave reader is able to cause reading of any one of the first transponders if the first radio-wave reader meets at least a first predetermined reader condition associated with the first radio-wave reader, and the second radio-wave reader is able to cause reading of any one of the at least one second transponder if the second reader meets at least a second predetermined reader condition associated with the second radio-wave reader,
wherein each first transponder is readable if at least a first predetermined identifier condition associated with that first transponder is met, and
wherein each second transponder is readable if at least a second predetermined identifier condition associated with that second transponder is met,
the method comprising steps of:
the first radio-wave reader causing reading of a radio-wave signal from a first transponder located on the vehicle to determine a zone identifier of a spatial zone containing a tyre to be replaced or a replacement tyre, when first conditions including the first predetermined reader condition and the first predetermined identifier condition are met;
the second radio-wave reader causing reading of a radio-wave signal from a second transponder located in the tyre to be replaced or the replacement tyre to determine a tyre identifier of the tyre to be replaced or the replacement tyre, when second conditions including the second predetermined reader condition and the second predetermined identifier condition are met;
the radio-wave communicator transmitting first association data to the remote data center to automatically update in a tyre-management database a first association between the zone identifier of the spatial zone containing the tyre to be replaced or the replacement tyre and the tyre identifier of the tyre to be replaced or the replacement tyre, if at least the first and second conditions are met simultaneously such that there is a simultaneous occurrence of a reading of the first transponder caused by the first radio-wave reader and a reading of the second transponder caused by the second radio-wave reader; and
directly after the step of transmitting the first association data to the remote data center resulting from the simultaneous occurrence of the reading of the first transponder and the second transponder, a step of transmitting second association data to the remote data center to automatically update in the tyre-management database a second association between the zone identifier of the spatial zone containing the tyre to be replaced or the replacement tyre and the tyre identifier of the tyre to be replaced or the replacement tyre, if only one of the first and second conditions is met or if none of the first and second conditions is met.

\* \* \* \* \*

UNITED STATES PATENT AND TRADEMARK OFFICE
CERTIFICATE OF CORRECTION

| | | |
|---|---|---|
| PATENT NO. | : 9,715,511 B2 | Page 1 of 1 |
| APPLICATION NO. | : 13/813803 | |
| DATED | : July 25, 2017 | |
| INVENTOR(S) | : Champredonde et al. | |

It is certified that error appears in the above-identified patent and that said Letters Patent is hereby corrected as shown below:

In the Specification

Column 2:
Line 62, "meet" should read --meets--.

Column 4:
Line 48, "to replace" should be deleted.

Column 7:
Line 18, "meet" should read --meets--;
Line 42, "meet" should read --meets--; and
Line 45, "meet" should read --meets--.

Column 8:
Line 40, "comprise" should read --comprises--; and
Line 43, "comprise" should read --comprises--.

Column 10:
Line 44, "generates" should read --generate--.

Column 12:
Line 27, "met" should be deleted; and
Line 29, "are not" should read --are not met--.

Signed and Sealed this
Seventeenth Day of October, 2017

Joseph Matal
*Performing the Functions and Duties of the
Under Secretary of Commerce for Intellectual Property and
Director of the United States Patent and Trademark Office*